(12) United States Patent
Nie et al.

(10) Patent No.: US 12,361,429 B2
(45) Date of Patent: Jul. 15, 2025

(54) LOGIN METHOD AND SYSTEM BASED ON CLOUD APPLICATION INSTANCE, AND RELATED DEVICE

(71) Applicant: Huawei Cloud Computing Technologies Co., Ltd., Guizhou (CN)

(72) Inventors: Kaixuan Nie, Gui'an (CN); Wei Huang, Gui'an (CN); Qiangqiang Liu, Shenzhen (CN); Gang Lei, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 239 days.

(21) Appl. No.: 17/976,398

(22) Filed: Oct. 28, 2022

(65) Prior Publication Data

US 2023/0054057 A1 Feb. 23, 2023

Related U.S. Application Data

(63) Continuation of application No. PCT/CN2021/090364, filed on Apr. 27, 2021.

(30) Foreign Application Priority Data

Apr. 30, 2020 (CN) .......................... 202010366058.3
May 22, 2020 (CN) .......................... 202010443499.9

(51) Int. Cl.
*H04L 9/40* (2022.01)
*G06F 21/31* (2013.01)
(Continued)

(52) U.S. Cl.
CPC .......... *H04L 63/0884* (2013.01); *G06F 21/31* (2013.01); *G06Q 20/16* (2013.01);
(Continued)

(58) Field of Classification Search
CPC ... H04L 63/0884; H04L 63/08; H04L 63/083; H04L 63/0807; H04L 63/0815;
(Continued)

(56) References Cited

U.S. PATENT DOCUMENTS 9,117,062 B1 * 8/2015 Fitch ...................... H04L 63/08
9,544,287 B1 * 1/2017 Sokolov .............. H04L 63/0884
(Continued)

FOREIGN PATENT DOCUMENTS

CN    103186851 A     7/2013
CN    103380423 A    10/2013
(Continued)

OTHER PUBLICATIONS

Lin Peng, "Discussion on key technologies of 5G cloud gaming platform networking," China Internet, Editorial Office Mailbox, Issue 2020, 01, with an English abstract, 8 pages.

*Primary Examiner* — Kyung H Shin
(74) *Attorney, Agent, or Firm* — Conley Rose, P.C.

(57) ABSTRACT

A login method includes a cloud application instance sending a login request for an application service node to a terminal device, such that after obtaining a login password input by a user, the terminal device sends a verification request carrying the login password and a device identity of the cloud application instance to an account management node. The account management node may verify the login password, and send verification success information to the cloud application instance. The cloud application instance logs in to the application service node based on the verification success information.

20 Claims, 16 Drawing Sheets

(51) Int. Cl.
*G06Q 20/16* (2012.01)
*G06Q 20/32* (2012.01)
*G06Q 20/40* (2012.01)

(52) U.S. Cl.
CPC ... *G06Q 20/3267* (2020.05); *G06Q 20/40145* (2013.01); *G06Q 20/4097* (2013.01); *H04L 63/08* (2013.01); *H04L 63/0807* (2013.01); *H04L 63/102* (2013.01)

(58) Field of Classification Search
CPC .............. H04L 63/0823; H04L 63/102; H04L 63/1408; H04L 67/02; H04L 41/02; H04L 67/10; H04L 63/168; H04L 9/3213; H04L 9/3234; H04L 9/32; H04L 9/0825; H04L 63/00; G06F 16/86; G06F 21/41; G06F 21/30; G06F 21/31
See application file for complete search history.

(56) References Cited

U.S. PATENT DOCUMENTS

| | | | |
|---|---|---|---|
| 10,771,469 B1* | 9/2020 | Sarukkai | ............... H04L 63/102 |
| 2008/0255991 A1 | 10/2008 | Wang | |
| 2012/0066670 A1 | 3/2012 | McCarthy | |
| 2015/0106213 A1 | 4/2015 | Guen | |
| 2016/0294806 A1 | 10/2016 | Du | |
| 2018/0075231 A1* | 3/2018 | Subramanian | ...... H04L 63/0807 |
| 2019/0147089 A1 | 5/2019 | Megahed et al. | |

FOREIGN PATENT DOCUMENTS

| | | |
|---|---|---|
| CN | 103595809 A | 2/2014 |
| CN | 104380325 A | 2/2015 |
| CN | 104717261 A | 6/2015 |
| CN | 105187362 A | 12/2015 |
| CN | 105187431 A | 12/2015 |
| CN | 105530293 A | 4/2016 |
| CN | 105741092 A | 7/2016 |
| CN | 105825378 A | 8/2016 |
| CN | 109150696 A | 1/2019 |
| CN | 109325342 A | 2/2019 |
| CN | 110135823 A | 8/2019 |
| CN | 110689334 A | 1/2020 |
| CN | 110796440 A | 2/2020 |
| EP | 2184698 A1 | 5/2010 |
| WO | 2018163087 A1 | 9/2018 |

* cited by examiner

LOGIN METHOD AND SYSTEM BASED ON CLOUD APPLICATION INSTANCE, AND RELATED DEVICE

CROSS-REFERENCE TO RELATED APPLICATIONS

This is a continuation of International Patent Application No. PCT/CN2021/090364 filed on Apr. 27, 2021, which claims priority to Chinese Patent Application No. 202010366058.3 filed on Apr. 30, 2020 and Chinese Patent Application No. 202010443499.9 filed on May 22, 2020. All of the aforementioned patent applications are hereby incorporated by reference in their entireties.

TECHNICAL FIELD

This disclosure relates to the field of cloud technologies, and in particular, to a login method and system based on a cloud application instance, and a related device.

BACKGROUND

With rapid development of cloud computing technologies and various network infrastructures, a traditional information technology (IT) service architecture is gradually migrating to a cloud platform, and more and more service applications are redesigned and used based on a cloud computing architecture. In the cloud computing architecture, a user rents a cloud application instance in a public cloud, and installs an application in the cloud application instance. The cloud application instance runs the application, renders video images in a running process, generates an audio stream, combines the video images and the audio stream into an audio and video stream, and transmits the audio and video stream to a terminal device held by the user through a network. The terminal device locally displays and plays the received audio and video stream to the user. In the foregoing manner, the application may be uninstalled from the terminal device to the public cloud, achieving that applications on the terminal device can be download-free, installation-free, and tap-to-use.

However, when an application in the cloud application instance needs to log in to an application service node, for example, when the application is an online game application, and the game application needs to log in to an online game server, because the cloud application instance is disposed in the public cloud, if the terminal device transmits password information to the cloud application instance, such that the cloud application instance requests login to the application service node, the cloud application instance of the public cloud can obtain the password information of the user in this process. When the user stops renting the cloud application instance, the password information may be recorded in the cloud application instance, and if another user rents this cloud application instance, the other user can obtain the password information input by the user last time, which poses a security risk.

SUMMARY

This disclosure provides a login method and system based on a cloud application instance, and a related device, to resolve a problem that there is a security risk when a cloud application instance logs in to an application service node.

According to a first aspect, a login method based on a cloud application instance is provided. The method includes the following steps: a cloud application instance sends a login request for an application service node to a terminal device. The terminal device obtains, based on the login request, a login password input by a user, and sends a verification request that carries the login password and a device identity of the cloud application instance to an account management node. The account management node verifies the login password, generates verification success information when verification succeeds, and sends verification success information to the cloud application instance based on the device identity, such that the cloud application instance logs in to the application service node based on the verification success information.

During implementation of the method described in the first aspect, each time a user logs in to an application service node using a cloud application instance, the cloud application instance notifies a terminal device. The terminal device sends, to an account management node, a login password used to log in to a cloud platform account for verification. If the verification succeeds, the cloud application instance can log in to the application service node, and login password information does not need to be sent to the cloud application instance, thereby resolving a problem that there is a security risk when the user logs in to the application service node using the cloud application instance.

In a possible implementation, before the account management node verifies the login password, the method further includes the following step: the account management node records registration information and instance status information, where the registration information includes a first correspondence between the cloud platform account and a registration password, and the instance status information includes a second correspondence between the cloud platform account and the device identity of the cloud application instance. Therefore, when verifying the login password, the account management node may first obtain the cloud platform account from the second correspondence based on the device identity of the cloud application instance that is carried in the verification request, obtain the registration password from the first correspondence based on the cloud platform account, compare the login password with the registration password, and when the login password is consistent with the registration password, confirm that the verification succeeds.

During specific implementation, the device identity may be a unique character string, may be a device feature code of the cloud application instance, and is a unique code used by the cloud platform to distinguish between cloud application instances. A specific form of the device identity is not limited in this disclosure. The login password and registration password are the password information of the cloud platform account of the user. The login password may include biological information of the user, such as iris information, face information, fingerprint information, and voiceprint information, or may include password information of the user, such as a character password and a short message service (SMS) verification code, or may be password information in another form. A specific form of the login password is not limited in this disclosure.

In the foregoing implementation, although the terminal device sends the login password to the account management node, the terminal device does not send the cloud platform account, and the account management node obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

Optionally, the registration information and the instance status information may be sent by a cloud platform to the account management node. The user may register the cloud platform account on the cloud platform and input the registration password. The cloud platform records the correspondence between the cloud platform account and the registration password information as the registration information. In addition, the user may pay on the cloud platform using the cloud platform account, to rent the cloud application instance, and the cloud platform records the correspondence between the cloud platform account and the device identity of the cloud application instance as the instance status information.

In a possible implementation, the cloud application instance may send a verification result obtaining request to the account management node, where the verification result obtaining request carries the device identity of the cloud application instance. The account management node sends verification success information to the cloud application instance based on the device identity of the cloud application instance that is carried in the verification result obtaining request.

During specific implementation, the cloud application instance may poll the terminal device through an event channel, to query whether the terminal device has sent the login password and the device identity to the account management node. When it is confirmed that the terminal device has sent the login password and the device identity to the account management node, the cloud application instance sends a verification result obtaining request to the account management node, where the verification result obtaining request includes the device identity of the cloud application instance, the account management node returns verification success information of the cloud platform account to the cloud application instance based on the device identity carried in the verification result obtaining request.

In the foregoing implementation, the terminal device sends the login password and the device identity to the account management node for verification, and the cloud application instance directly obtains the verification success information using the device identity, such that the cloud application instance can be prevented from recording the login password, thereby improving data transmission security.

In a possible implementation, a process in which the cloud application instance logs in to the application service node based on the verification success information may include the following step: the cloud application instance sends the verification success information to the application service node. The application service node sends a check request to the account management node, where the check request carries the verification success information, the account management node determines that the account management node records the verification success information, sends an application account creation request to the application service node. The application service node creates an application account based on the application creation request, and allows the cloud application instance to log in to the application service node using the application account.

During specific implementation, the account management node records a correspondence between the verification success information and the cloud platform account. After receiving the check request that is sent by the application service node and that carries the verification success information, when determining that the account management node records the verification success information carried in the check request, which indicates that login verification succeeds, the account management node may further determine whether the cloud platform account corresponding to the verification success information is bound to an application account. If the cloud platform account is bound to an application account, the application account bound to the cloud platform account may be returned to the application service node. The application service node may obtain various application data such as a game archive, a historical playback record, and favorites content of the user from the application service node based on the application account, and then allow the cloud application instance to log in to the application service node using the application account.

If the account management node determines that the cloud platform account is not bound to an application account, the account management node sends an application account creation request to the application service node. The application service node may create an application account based on the application creation request, and allow the cloud application instance to log in to the application service node using the newly created application account. The application service node may further return the newly created application account to the account management node, such that the account management node may store a binding relationship between the cloud platform account of the user and the newly created application account in a database.

In the foregoing implementation, the cloud platform account of the user may be bound to the application account. In this way, each time the user logs in to the application service node using the cloud application instance, the user only needs to send, to the account management node using the terminal device, the login password corresponding to the cloud platform account for verification. If the verification of the cloud platform account succeeds, the user can log in to the application service node using the cloud platform account and without recording the application account.

In a possible implementation, before the cloud application instance sends the login request for the application service node to the terminal device, the method further includes the following step: the terminal device establishes a connection channel to the cloud application instance, and obtaining the device identity from the cloud application instance.

During specific implementation, the connection channel may be an event pipeline or may be another connection channel between the cloud application instance and the terminal device that is used to transmit data. This is not limited in this disclosure.

In the foregoing implementation, only anonymized status information or action information is transmitted between the cloud application instance and the terminal device through the event pipeline, and no password information related to user privacy is transmitted, such that privacy data of a user is strongly ensured.

In a possible implementation, the cloud application instance includes a virtual machine, a container, and a bare metal server.

In a possible implementation, the application service node includes a game server, an education application service node, a video application service node, a social application service node, and a virtual reality application service node.

In a possible implementation, the terminal device includes a mobile phone, a tablet computer, a personal computer, a smart television, and a game console.

According to a second aspect, a login system based on a cloud application instance is provided. The system includes a cloud application instance, a terminal device, and an account management node. The cloud application instance is configured to send a login request for an application service node to a terminal device. The terminal device is configured to: obtain, based on the login request, a login password input by a user, and send a verification request that carries the login password and a device identity of the cloud application instance to an account management node. The account management node is configured to: verify the login password, generate verification success information when verification succeeds, and send verification success information to the cloud application instance based on the device identity. The cloud application instance is further configured to log in to the application service node based on the verification success information The second aspect or any implementation of the second aspect is a system implementation corresponding to the first aspect or any implementation of the first aspect. A description in the first aspect or any implementation of the first aspect is applicable to the second aspect or any implementation of the second aspect. Details are not described herein again.

According to a third aspect, a login method based on a cloud application instance is provided. The method includes the following steps: a terminal device receives a login request for an application service node that is sent by a cloud application instance, and then obtains, based on the login request, a login password input by a user, and sends a verification request that carries the login password and a device identity of the cloud application instance to an account management node, where the verification request is used to indicate the account management node to: verify the login password, generate verification success information when verification succeeds, and send verification success information to the cloud application instance based on the device identity.

During implementation of the method described in the third aspect, each time a user logs in to an application service node using a cloud application instance, the cloud application instance notifies a terminal device. The terminal device sends, to an account management node, a login password used to log in to a cloud platform account for verification. If the verification succeeds, the cloud application instance can log in to the application service node, and login password information does not need to be sent to the cloud application instance, thereby resolving a problem that there is a security risk when the user logs in to the application service node using the cloud application instance.

In a possible implementation, before the terminal device receives login request for the application service node that is sent by the cloud application instance, the method may further include the following step: the terminal device establishes a connection channel to the cloud application instance, and obtaining the device identity from the cloud application instance.

During specific implementation, the connection channel may be an event pipeline or may be another connection channel between the cloud application instance and the terminal device that is used to transmit data. This is not limited in this disclosure.

In the foregoing implementation, only anonymized status information or action information is transmitted between the cloud application instance and the terminal device through the event pipeline, and no password information related to user privacy is transmitted, such that privacy data of a user is strongly ensured.

According to a fourth aspect, a terminal device is provided. The terminal device includes: a receiving module, configured to receive a login request for an application service node that is sent by a cloud application instance, a password information obtaining module, configured to obtain, based on the login request, a login password input by a user, and a sending module, configured to send a verification request that carries the login password and a device identity of the cloud application instance to an account management node, where the verification request is used to indicate the account management node to: verify the login password, and send verification success information to the cloud application instance based on the device identity.

Any one of the fourth aspect or the implementations of the fourth aspect is an apparatus implementation corresponding to any one of the third aspect or the implementations of the third aspect. A description in any one of the fourth aspect or the implementations of the fourth aspect is applicable to any one of the third aspect or the implementations of the third aspect. Details are not described herein again.

According to a fifth aspect, a login method based on a cloud application instance is provided, where the method includes the following steps: an account management node receives a verification request that carries a device identity of a cloud application instance and a login password and that is sent by a terminal device, where the login password is a login password obtained by the terminal device from a user after the terminal device receives the login request for the application service node that is sent by the cloud application instance. The account management node verifies the login password, when verification succeeds, generates verification success information, and sends the verification success information to the cloud application instance based on the device identity, such that the cloud application instance logs in to the application service node based on the verification success information.

During implementation of the method described in the fifth aspect, each time a user logs in to an application service node using a cloud application instance, the cloud application instance notifies a terminal device. The terminal device sends, to an account management node, a login password used to log in to a cloud platform account for verification. If the verification succeeds, the cloud application instance can log in to the application service node, and login password information does not need to be sent to the cloud application instance, thereby resolving a problem that there is a security risk when the user logs in to the application service node using the cloud application instance.

In a possible implementation, before the account management node receives the verification request that carries the device identity of the cloud application instance and the login password and that is sent by the terminal device, the method further includes the following step: the account management node records registration information and instance status information, where the registration information includes a first correspondence between the cloud platform account and a registration password, and the instance status information includes a second correspondence between the cloud platform account and the device identity of the cloud application instance. Therefore, when verifying the login password, the account management node may first obtain the cloud platform account from the second correspondence based on the device identity of the cloud application instance that is carried in the verification request, obtain the registration password from the first correspondence based on the cloud platform account, compare the login password with the registration password, and when the login password is consistent with the registration password, confirm that the verification succeeds.

During specific implementation, the device identity may be a unique character string, may be a device feature code of the cloud application instance, and is a unique code used by the cloud platform to distinguish between cloud application instances. A specific form of the device identity is not limited in this disclosure. The login password and registration password are the password information of the cloud platform account of the user. The login password may include biological information of the user, such as iris information, face information, fingerprint information, and voiceprint information, or may include password information of the user, such as a character password and an SMS verification code, or may be password information in another form. A specific form of the login password is not limited in this disclosure.

In the foregoing implementation, although the terminal device sends the login password to the account management node, the terminal device does not send the cloud platform account, and the account management node obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

Optionally, the registration information and the instance status information may be sent by a cloud platform to the account management node. The user may register the cloud platform account on the cloud platform and input the registration password. The cloud platform records the correspondence between the cloud platform account and the registration password information as the registration information. In addition, the user may pay on the cloud platform using the cloud platform account, to rent the cloud application instance, and the cloud platform records the correspondence between the cloud platform account and the device identity of the cloud application instance as the instance status information.

According to a sixth aspect, an account management node is provided, where the node includes: a receiving module, configured to receive a verification request that carries a device identity of a cloud application instance and a login password and that is sent by a terminal device, where the login password is a login password obtained by the terminal device from a user after the terminal device receives a login request for an application service node that is sent by the cloud application instance; and a verification module, configured to verify the login password, when verification succeeds, generates verification success information, and sends the verification success information to the cloud application instance based on the device identity, such that the cloud application instance logs in to the application service node based on the verification success information.

Any one of the sixth aspect or the implementations of the sixth aspect is an apparatus implementation corresponding to any one of the fifth aspect or the implementations of the fifth aspect. The description in any one of the sixth aspect or the implementations of the sixth aspect is applicable to any one of the fifth aspect or the implementations of the fifth aspect. Details are not described herein.

According to a seventh aspect, a computer-readable storage medium including instructions is provided. When the instructions are run on a computing device, the computing device performs the method described in the third aspect or the fifth aspect.

According to an eighth aspect, a computer program product is provided. When the computer program product is read and executed by a computing device, the method described in the third aspect or the fifth aspect is implemented.

According to a ninth aspect, a terminal device is provided, including a processor and a memory. When the processor executes code in the memory, a computing device implements the method described in the third aspect.

According to a tenth aspect, a computing device is provided, including a processor and a memory. When the processor executes code in the memory, the computing device implements the method described in the fifth aspect.

DESCRIPTION OF EMBODIMENTS

Figure 1A:
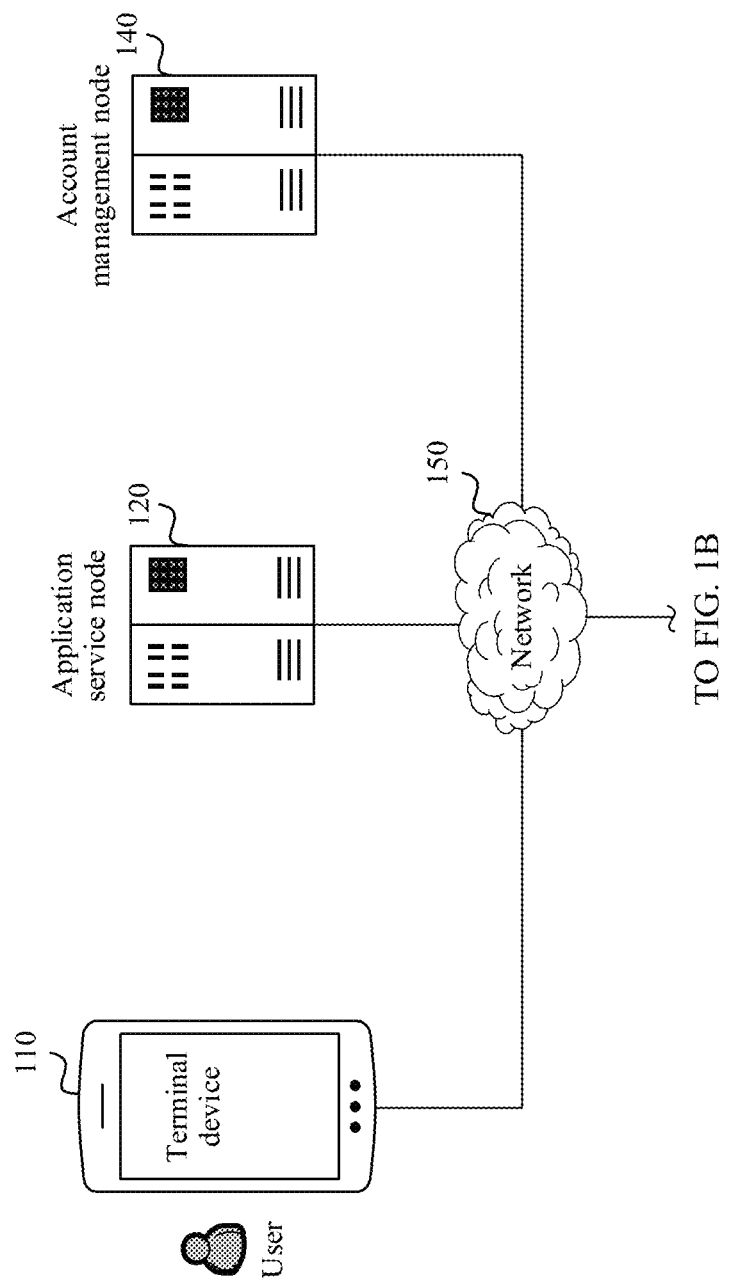
FIG. 1A and FIG. 1B are a schematic diagram of an architecture of a public cloud system.

The following describes technical solutions in embodiments of the present disclosure with reference to accompanying drawings in embodiments of the present disclosure. Apparently, the described embodiments are merely some rather than all of the embodiments of the present disclosure. All other embodiments obtained by a person of ordinary skill in the art based on embodiments of the present disclosure without creative efforts shall fall within the protection scope of the present disclosure.

For ease of understanding of embodiments of this disclosure, some terms in this disclosure are first explained and described.

Container: The container is a group of processes that are isolated from each other due to resource restrictions.

Cloud application instance: The cloud application instance is a container, virtual machine, or bare metal server that is virtualized on a physical server and has a mobile phone operating system and a virtual mobile phone function. In essence, applications on a mobile phone are transferred to a container, virtual machine, or bare metal server on a public cloud for running. Different cloud application instances are isolated from each other and do not interfere with each other. Local mobile phone applications can be installed on the cloud application instance and run on the cloud application instance. Audio and video streams generated during running can be sent to a local terminal device of a user for display and playback, control commands generated by the local terminal device of the user based on the displayed and played audio and video streams may also be sent to the cloud application instance. The cloud application instance controls a running status of the applications each based on the control command, such that the applications of the local mobile phone may be transferred to the cloud application instance for running. The local terminal device of the user does not need to install a large number of applications that consume hardware resources, such that the application can be lightweight.

Public cloud: A core attribute of the public cloud is shared resource service. Which means a cloud infrastructure and services provided by a third-party supplier for users to use through a public network (such as the Internet). The users can obtain permission to use the cloud infrastructure and services by paying fees.

Software Development Kit (SDK): The SDK is a set of development tools used by developers to establish applications for specific software packages, software frameworks, hardware platforms, operating systems, and the like. Simply speaking, the SDK is a tool package that can implement a function of a software product. With the SDK, the developers do not need to develop each function of the product. Instead, the developers can integrate a required function into the product by directly selecting, based on the required function of the product, a required SDK.

Next, an application scenario in this disclosure is briefly described.

With rapid development of cloud computing technologies and various network infrastructures, a traditional IT service architecture is gradually migrating to a cloud platform, and more and more service applications are redesigned and used based on a cloud computing architecture. In the cloud computing architecture, a user rents a cloud application instance in a public cloud, and installs an application in the cloud application instance. The cloud application instance runs the application, renders video images in a running process, generates an audio stream, combines the video images and the audio stream into an audio and video stream, and transmits the audio and video stream to a terminal device held by the user through a network. The terminal device locally displays and plays the received audio and video stream. In the foregoing manner, the application may be uninstalled from the terminal device to the public cloud, achieving that applications on the terminal device can be download-free, installation-free, and tap-to-use.

Figure 1B:
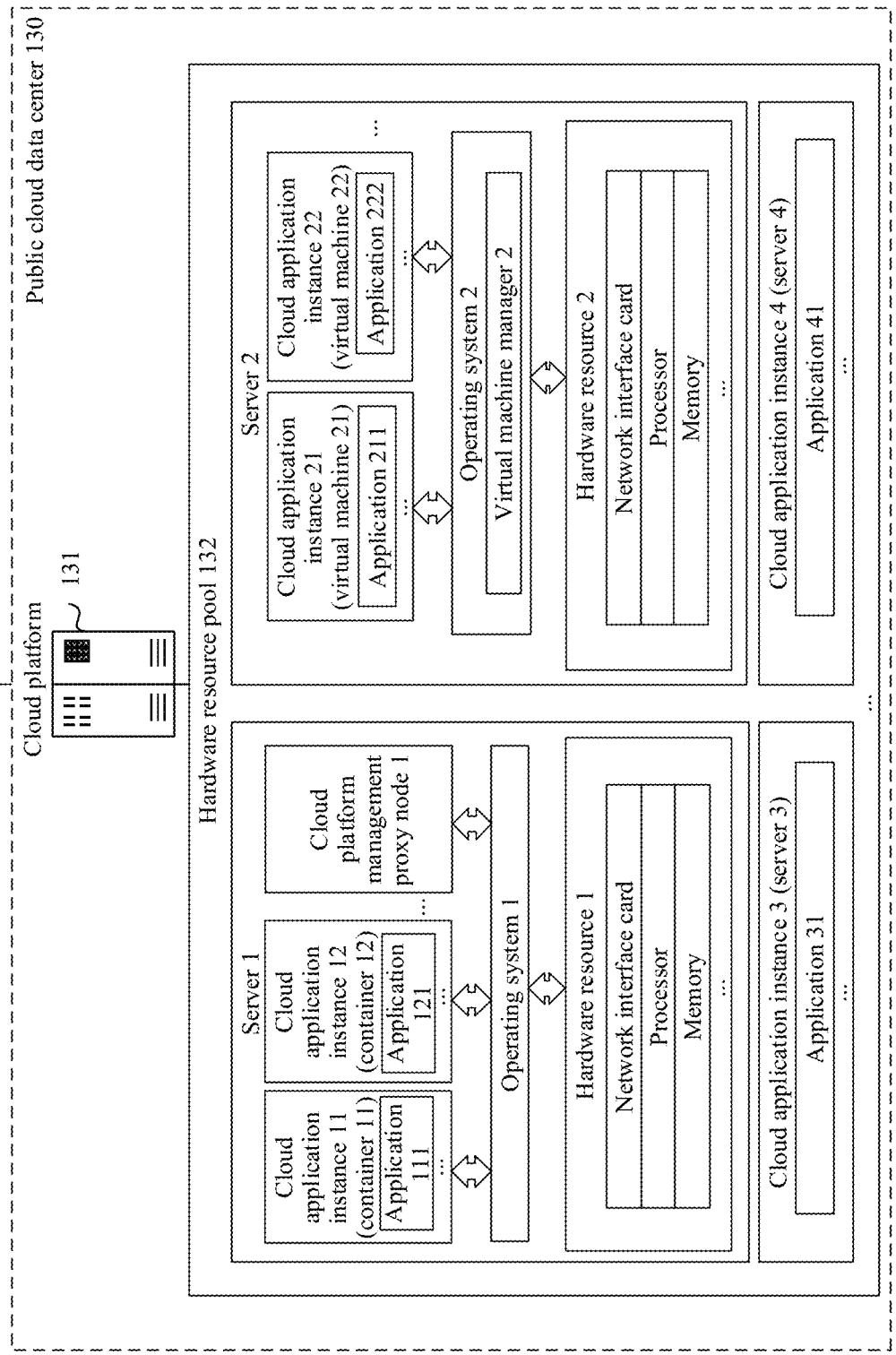

FIG. 1A and FIG. 1B are a schematic diagram of an architecture of a cloud computing system. As shown in FIG. 1A and FIG. 1B, the system includes a terminal device 110, an application service node 120, an account management node 140, and a public cloud data center 130. In addition, the terminal device 110, the application service node 120, the public cloud data center 130, and the account management node 140 are connected using a network 150. The terminal device 110 may be an electronic device having a streaming media playback capability, such as a smartphone, a palmtop processing device, a tablet computer, a mobile notebook computer, a virtual reality device, a wearable device, or an integrated palmtop. In FIG. 1A and FIG. 1B, an example in which the terminal device 110 is a smartphone is used for description. However, this is not limited in this disclosure.

The terminal device 110 is held by a user.

The application service node 120 and the account management node 140 may be implemented by a general-purpose physical server such as an ARM server or an X86 server, or may be a virtual machine (VM) implemented using a network functions virtualization (NFV) technology. The virtual machine means a complete computer system that is simulated using software and that has a complete hardware system function and runs in a completely isolated environment. The application service node 120 is configured to provide various services. The application service node 120 may include a game server, an education application service node 120, a video application service node 120, a social application service node 120, a virtual reality application service node 120, and the like. This is not limited in this disclosure.

The public cloud data center 130 includes a cloud platform 131 and a hardware resource pool 132. The cloud platform 131 may be implemented by a general-purpose physical server such as an ARM server or an X86 server, or may be a virtual machine implemented using an NFV technology. The virtual machine means a complete computer system that is simulated using software and that has a complete hardware system function and runs in a completely isolated environment.

The hardware resource pool 132 may include at least one physical server (in FIG. 1A and FIG. 1B, an example in which the resource pool includes a server 1, a server 2, a server 3, and a server 4 is used for description). The physical server may be a general-purpose physical server such as an ARM server or an X86 server. This is not limited in this disclosure. There is an internal network connection between physical servers in the hardware resource pool 132, and each physical server may communicate with another physical server and the cloud platform 131 using the internal network.

Each physical server may run at least one cloud application instance. The cloud application instance may be any one of virtual machines (for example, a virtual machine 21 and a virtual machine 22), containers (for example, a container 11 and a container 22), and bare metal servers (BMS) (for example, a server 3 and a server 4) in FIG. 1B. The public cloud data center 130 may provide a cloud application instance leasing service for a user, and the terminal device 110 may rent cloud application instances of various specifications based on requirements of the terminal device 110, and install various applications in the cloud application instances. For example, assuming that a user needs to use an application 111, the user may send a purchase request to the cloud platform 131 to rent a cloud application instance, obtain permission to control the cloud application instance, and install the application in the cloud application instance. As shown in FIG. 1A and FIG. 1B, if the cloud application instance is implemented using a container, the cloud platform 131 may notify, based on a running environment required by the application, a cloud platform management proxy node of a server to create the container, and install the application 111 in the cloud application instance. If the cloud application instance is implemented using a virtual machine, the cloud platform 131 may create the virtual machine based on a running environment required by the application using a virtual machine manager, and install the application 111 on the cloud application instance. If the cloud application instance is implemented using a BMS, the cloud platform 131 may select a proper BMS based on a running environment required by the application, and install the application 111 on the BMS, to obtain a cloud application instance on which the application 111 is installed. In this disclosure, the cloud application instance is a virtual resource in the public cloud data center 130, and the virtual resource runs a mobile phone operating system. A specific form of the cloud application instance in the public cloud data center 130 is not limited in this disclosure.

After the terminal device 110 rents the cloud application instance (that is, the container 11) on which the application 111 runs, the terminal device 110 may remotely manipulate the application 111 on the cloud application instance. The cloud application instance may adjust hardware specifications based on a rent fee. A higher rent fee indicates higher hardware specifications. The cloud application instance may respond to a remote operation of a user, and send a subsequently generated audio and video stream to the terminal device 110 for display and playback, such that the user can use an application program with a relatively high requirement on hardware resources using a terminal device 110 with relatively limited image processing and data computing capabilities, or even a terminal device 110 with only a streaming media playback capability.

It should be understood that, after the terminal device 110 stops remotely manipulating the application 111 on the cloud application instance, the cloud platform management node 131 may release the cloud application instance (that is, the container 11), and the released resource may be used by another user. When the terminal device 110 requests to remotely manipulate the application 111 on the cloud application instance again, the cloud platform management node 131 may create a cloud application instance on which the application 111 is installed for the user to use again.

Figure 2A:
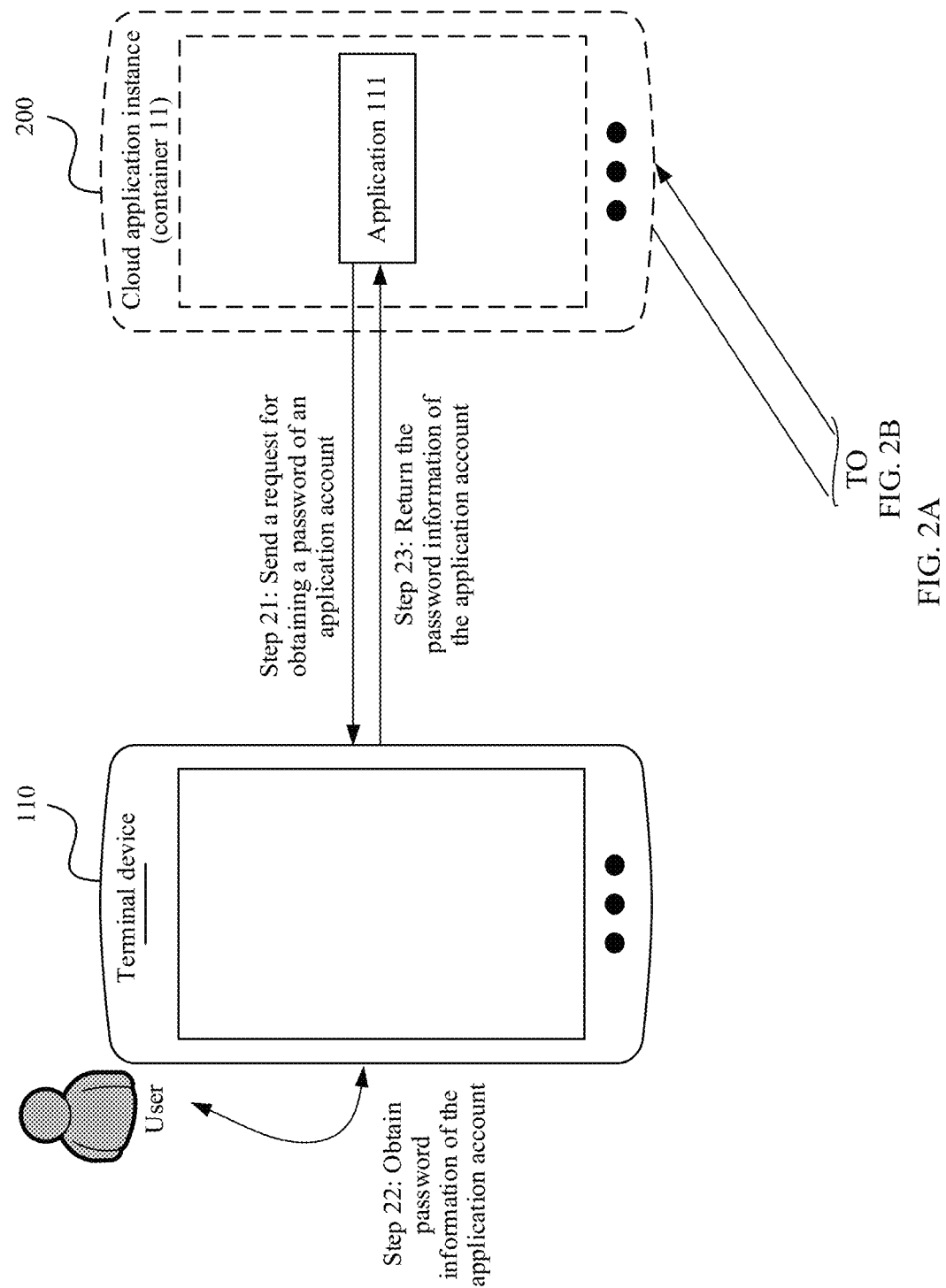
FIG. 2A and FIG. 2B are a schematic flowchart of logging in to an application service node by a cloud application instance in a cloud computing architecture.
Figure 2B:
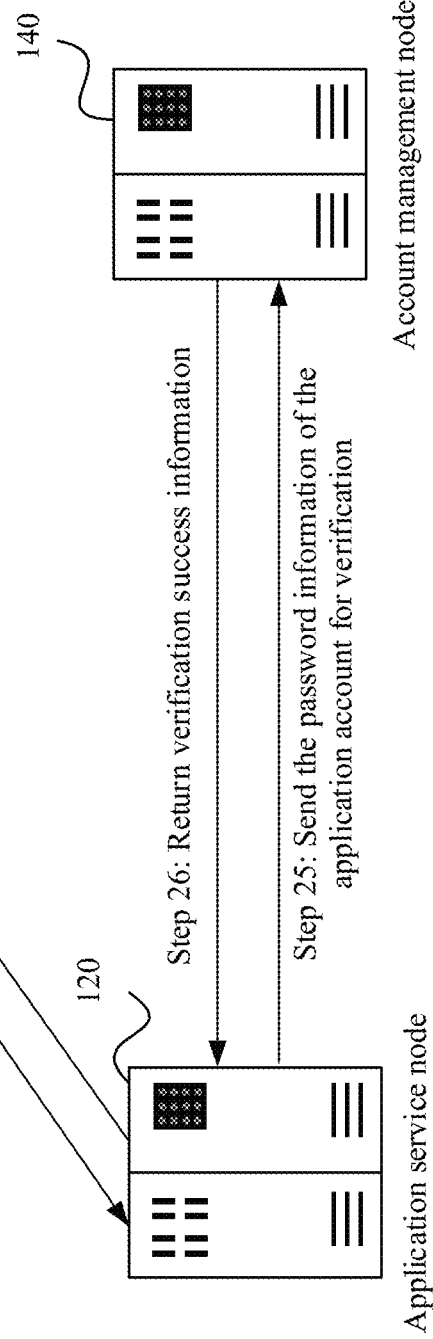

The following describes a specific procedure in which the user logs in to the application service node 120 (for example, the container 11 in FIG. 1B) using the cloud application instance in the cloud computing architecture shown in FIG. 1A and FIG. 1B. As shown in FIG. 2A and FIG. 2B, in the cloud computing architecture, a specific procedure in which the user logs in to the application service node 120 using the cloud application instance includes the following steps:

Step 21: The cloud application instance 200 sends an obtaining request for application account password information to the terminal device 110.

Step 22: The terminal device 110 obtains, based on the obtaining request, application account password information input by the user, where the application account password information may include an application account of the user, biological information of the user, password information, or the like.

Step 23: The terminal device 110 sends the obtained application account password information to the cloud application instance 200.

Step 24: After receiving the application account password information of the user, the cloud application instance 200 sends the application account password information of the user to the application service node 120 to request login.

Step 25: The application service node 120 sends the application account password information to the account management node 140 to request verification.

Step 26: The account management node 140 performs authentication on the received application account password information, generates verification success information such as a token after the authentication succeeds, and returns the verification success information to the application service node 120.

Step 27: The application service node 120 sends the verification success information to the cloud application instance 200. The cloud application instance 200 may log in to the application service node 120 using the Token, and use various services provided by the application service node 120. However, because a provider of the public cloud data center 130 and a provider of the application service node 120 are usually different organizations, out of concern that an application account password may be leaked, the user usually refuses to send, to the public cloud data center 130 for authentication, the application account password information used by the user to log in to the application service node 120, causing a login failure of the user.

In conclusion, when an application in the cloud application instance 200 needs to log in to the application service node 120, for example, when the application is an online game application, and the game application needs to log in to an online game server, because the cloud application instance 200 is disposed in the public cloud data center 130, if the terminal device 110 transmits password information to the cloud application instance 200, such that the cloud application instance 200 requests login to the application service node 120, the cloud application instance 200 of the public cloud data center 130 can obtain the password information of the user in this process. When the user stops renting the cloud application instance 200, the password information may be recorded in the cloud application instance 200, and if another user rents this cloud application instance 200, the other user can obtain the password information input by the user last time, which poses a security risk.

To resolve a problem that there is a security risk and user experience is poor when a user logs in to an application using a cloud application instance 200 in the cloud computing architecture shown in FIG. 1A and FIG. 1B, this disclosure provides a login method based on a cloud application instance 200. In the method, each time the user logs in to an application service node 120 using a cloud application instance 200, the cloud application instance 200 notifies the terminal device 110, and the terminal device 110 sends, to the account management node 140, a login password used to log in to a cloud platform account for verification. If the verification succeeds, the cloud application instance 200 can log in to the application service node 120, and login password information does not need to be sent to the cloud application instance 200, thereby resolving the problem that there is a security risk when the user logs in to the application using the cloud application instance 200.

Figure 3A:
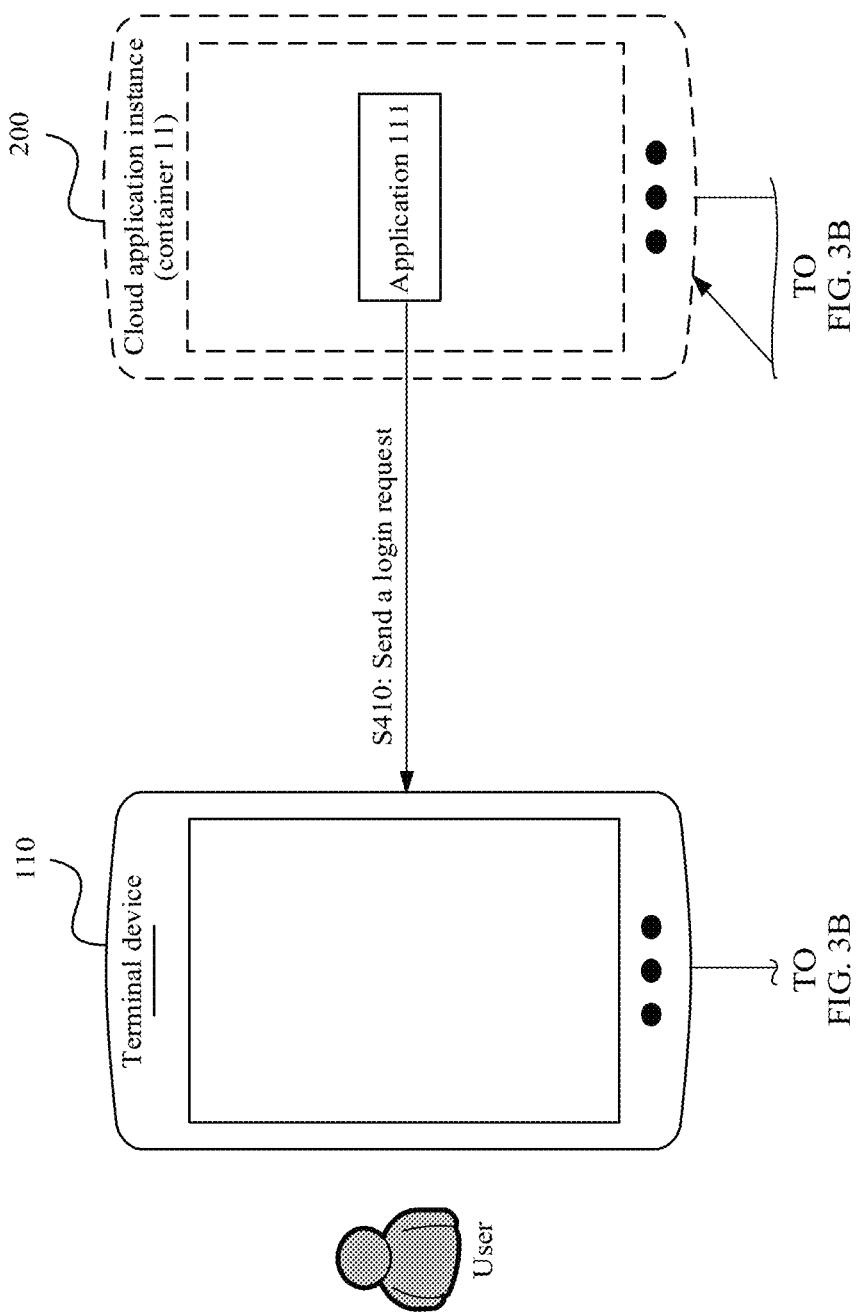
FIG. 3A and FIG. 3B are a schematic flowchart of steps of a login method based on a cloud application instance according to this disclosure.
Figure 3B:
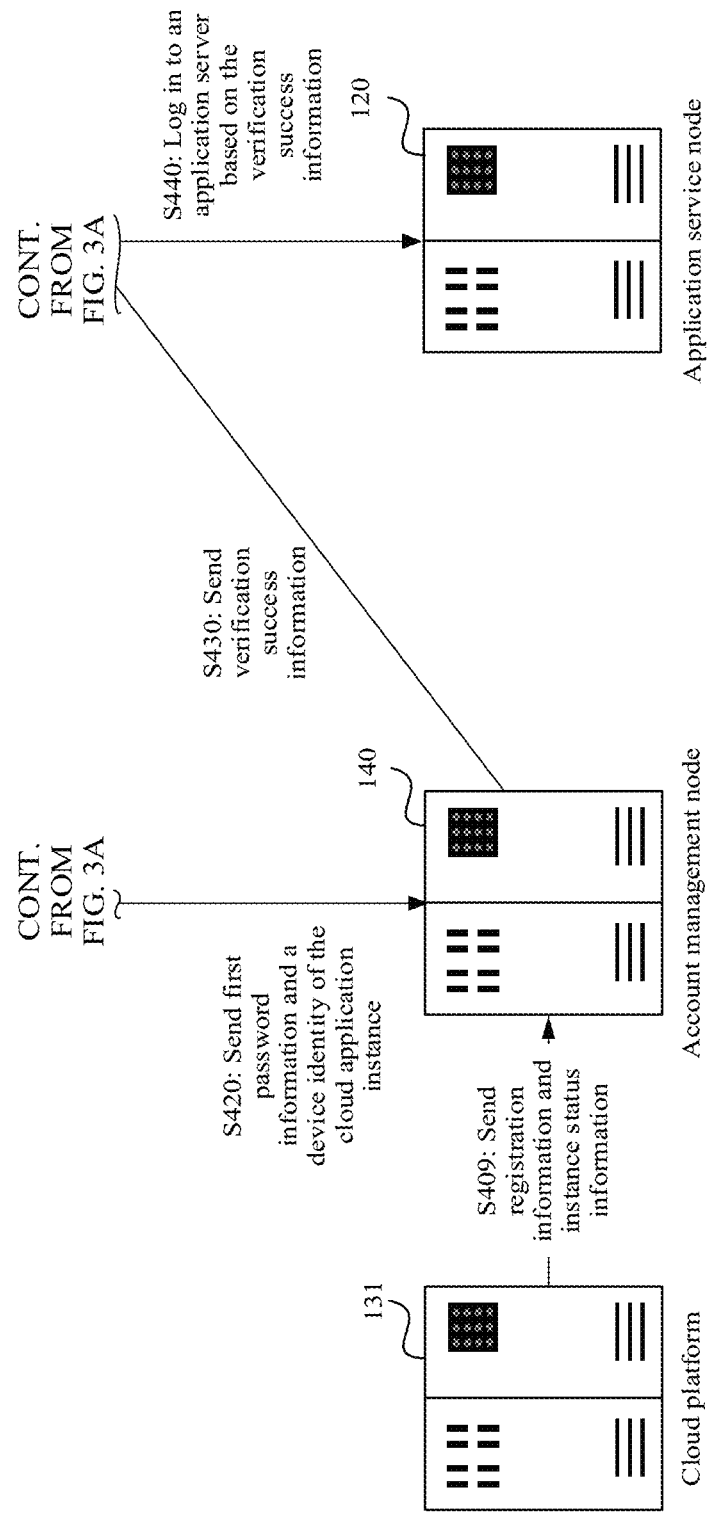

As shown in FIG. 3A and FIG. 3B, the login method based on a cloud application instance 200 provided in this disclosure may include the following steps.

S409: A cloud platform 131 sends registration information and instance status information to an account management node 140, where the registration information includes a first correspondence between a cloud platform account and a registration password, the status information includes a second correspondence between a device identity of the cloud application instance 200 and the cloud platform account, and the account management node 140 may record the second correspondence. The registration information and the instance status information may be sent by the cloud platform 131 to the account management node 140. The user may register the cloud platform account on the cloud platform 131 and input the registration password. The cloud platform 131 records the correspondence between the cloud platform account and the registration password information as the registration information. In addition, the user may pay on the cloud platform using the cloud platform account, to rent the cloud application instance 200, and the cloud platform 131 records the correspondence between the cloud platform account and the device identity of the cloud application instance 200 as the instance status information.

In an embodiment, the user may alternatively send a request for registering the cloud platform account to the account management node 140, and the account management node 140 may record registration information in the registration request. The registration information includes the first correspondence between the cloud platform account and the registration password. This is not limited in this disclosure.

S410: The cloud application instance 200 sends a login request for an application service node 120 to a terminal device 110.

The login request does not include user privacy information such as an account of the user. During specific implementation, the cloud application instance 200 may send the login request to the terminal device 110 using an event pipeline such as a notify event pipeline. The event pipeline cannot transmit user privacy data, and can transmit only anonymized status information or action information. Sending the login request through the pipeline can avoid user privacy leakage and improve data transmission security.

S420: The terminal device obtains, based on the login request, a login password input by a user, and sends a verification request that carries the login password and a device identity of the cloud application instance 200 to an account management node 140.

It should be noted that the login password is password information of the cloud platform account of the user. The login password may include biological information of the user, such as iris information, face information, fingerprint information, and voiceprint information, or may include password information of the user, such as a character password and an SMS verification code, or may be password information in another form. A specific form of the login password is not limited in this disclosure.

The device identity is a unique character string, may be a device feature code of the cloud application instance 200, and is a unique code used by the cloud platform to distinguish between cloud application instances 200. A specific form of the device identity is not limited in this disclosure. The login password and registration password are the password information of the cloud platform account of the user. During specific implementation, the device identity of the cloud application instance 200 may be a device identity obtained by the cloud application instance 200 before step S410 and after the terminal device 110 establishes a connection channel to the cloud application instance 200. The connection channel may be the event pipeline such as the notify event pipeline in the foregoing content, or may be another connection channel between the cloud application instance 200 and the terminal device 110 that is used to transmit data. This is not limited in this disclosure.

It should be noted that, with reference to the foregoing content, it can be learned that each time the user remotely uses the cloud application instance 200 using the terminal device 110, the cloud application instance 200 connected to the terminal device 110 may not be the same cloud application instance 200. Therefore, the device identity of the cloud application instance 200 changes. However, regardless of how the device identity of the cloud application instance 200 changes, each time the terminal device 110 establishes a connection to the cloud application instance 200, the device identity of the cloud application instance 200 currently connected to the terminal device 110 may be obtained through the connection channel. For example, when the terminal device 110 requests to run the application 11 using the cloud application instance 200 for the first time, the cloud platform 131 creates the container 11, and establishes a connection channel 1 between the container 11 and the terminal device 110. The terminal device 110 may obtain a device identity of the container 11 using the connection channel 1. After the terminal device 110 disconnects from the container 1, the cloud platform 131 may release the container 1, and the released resource may be provided for another user to use. When the user requests to run the application 11 using the cloud application instance 200 for the second time, the cloud platform 131 may re-create a container 12, and establish a connection channel 2 between the container 12 and the terminal device 110. The terminal device 110 may obtain a device identity of the container 12 using the connection channel 2. It should be understood that the foregoing example is merely used for description, and does not constitute a specific limitation.

S430: The account management node 140 verifies the login password, generates verification success information when the verification succeeds, and sends the verification success information to the cloud application instance 200 based on the device identity. The verification success information may be a token, and may be a unique character string generated based on the device identity of the cloud application instance 200. This is not limited in this disclosure.

In an embodiment, before S410, when the user sends the request for registering the cloud platform account to the account management node 140, the account management node 140 may record the registration information in the registration request. The registration information includes the first correspondence between the cloud platform account and the registration password. In addition, each time after the terminal device 110 establishes a connection to the cloud application instance 200, the cloud platform may further send the status information of the cloud application instance 200 to the account management node 140. The status information includes a second correspondence between the device identity of the cloud application instance 200 and the cloud platform account, and the account management node 140 may record the second correspondence. In this way, in step S430, after receiving the login password sent by the user and the device identity, the account management node 140 may first determine, based on the device identity and the stored second correspondence, the cloud platform account corresponding to the device identity, and then obtain, based on the first correspondence and the cloud platform account, the registration password input during user registration. In this way, in step S430, the account management node 140 may compare the login password with the registration password, and when the login password is consistent with the registration password, confirm that the verification succeeds and generate the verification success information. If the login password is inconsistent with the registration password, the account management node 140 may return password error information to the terminal device 110, and the user may re-enter a password for re-verification. It may be understood that although the terminal device 110 sends the login password to the account management node 140, the terminal device 110 does not send the cloud platform account, and the account management node 140 obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

The cloud application instance 200 may poll the terminal device 110 through an event channel, to query whether the terminal device 110 has sent the login password and the device identity to the account management node 140. When it is confirmed that the terminal device 110 has sent the login password and the device identity to the account management node 140, the cloud application instance 200 sends a verification result obtaining request to the account management node 140, where the verification result obtaining request includes the device identity of the cloud application instance 200, the account management node 140 returns verification success information of the cloud platform account to the cloud application instance 200 based on the device identity carried in the verification result obtaining request.

It may be understood that the terminal device 110 sends the login password and the device identity to the account management node 140 for verification, and the cloud application instance 200 directly obtains the verification success information using the device identity, such that the cloud application instance 200 can be prevented from recording the login password, thereby improving data transmission security.

S440: The cloud application instance 200 logs in to the application service node 120 based on the verification success information.

During specific implementation, the cloud application instance 200 may send the verification success information to the application service node 120. The application service node 120 sends a check request to the account management node 140 based on the verification success information. The check request carries the verification success information. When determining that the account management node 140 records the verification success information, the account management node 140 may return check success information to the application service node 120, such that the application service node 120 allows the cloud application instance 200 to log in to the application service node 120. Otherwise, the account management node 140 returns check failure information, and the application service node 120 does not allow the cloud application instance 200 to log in to the application service node 120.

In an embodiment, the account management node 140 records a correspondence between the verification success information and the cloud platform account. After receiving the check request that is sent by the application service node 120 and that carries the verification success information, when determining that the account management node 140 records the verification success information carried in the check request, which indicates that login verification succeeds, the account management node 140 may further determine whether the cloud platform account corresponding to the verification success information is bound to an application account. If the cloud platform account is bound to an application account, the application account bound to the cloud platform account may be returned to the application service node 120. The application service node 120 may obtain various application data such as a game archive, a historical playback record, and favorites content of the user from the application service node 120 based on the application account, and then allow the cloud application instance 200 to log in to the application service node 120 using the application account. If the account management node 140 determines that the cloud platform account is not bound to an application account, the account management node 140 may send an application account creation request to the application service node 120. The application service node 120 may create an application account based on the application creation request, and allow the cloud application instance 200 to log in to the application service node 120 using the newly created application account. The application service node 120 may further return the newly created application account to the account management node 140, such that the account management node 140 may store a binding relationship between the cloud platform account of the user and the newly created application account in a database. After the cloud platform account of the user is bound to the application account, each time the user logs in to the application service node 120 using the cloud application instance 200, the user only needs to send, to the account management node 140 using the terminal device 110, the login password corresponding to the cloud platform account for verification. If the verification of the cloud platform account succeeds, the user can log in to the application service node 120 without recording the application account.

It should be noted that, in this embodiment of this disclosure, although the account management node 140 is configured to verify the cloud platform account, because the cloud platform account is in a binding relationship with the application account, the account management node 140 may be operated and maintained by a service provider of the application service node 120.

In conclusion, in the login method based on a cloud application instance 200 provided in this disclosure, the cloud platform account of the user is bound to the application account. Each time the user logs in to the application service node 120 using the cloud application instance 200, the cloud application instance 200 notifies the terminal device 110. The terminal device 110 sends, to the account management node 140, the login password used to log in to the cloud platform account for verification. If the verification succeeds, the cloud application instance 200 can log in to the application service node 120, and login password information does not need to be sent to the cloud application instance 200, thereby resolving the problem that there is a security risk when the user logs in to the application using the cloud application instance 200.

The following describes the method provided in this disclosure using an application scenario as an example in which an application is a cloud game, a terminal device 110 is a smartphone, a cloud application instance 200 is a container, a user has never registered an application account, and logs in to an application service node 120 using the cloud application instance 200 for the first time.

Figure 4A:
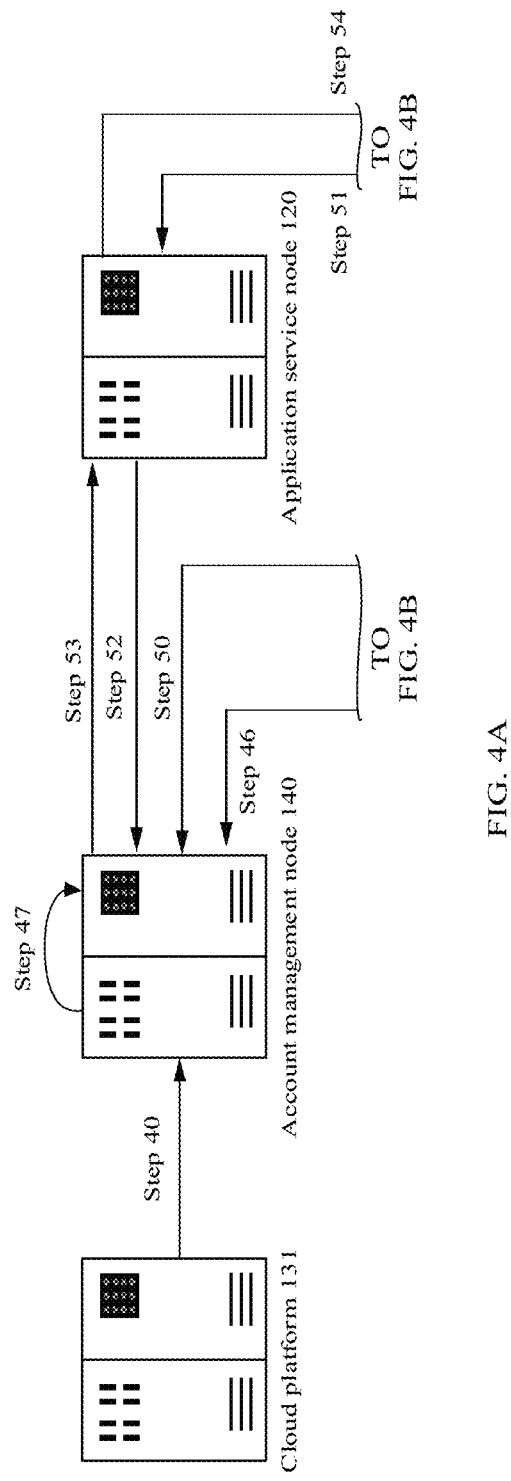
FIG. 4A and FIG. 4B are a schematic flowchart of steps of a login method based on a cloud application instance according to this disclosure in an application scenario.
Figure 4B:
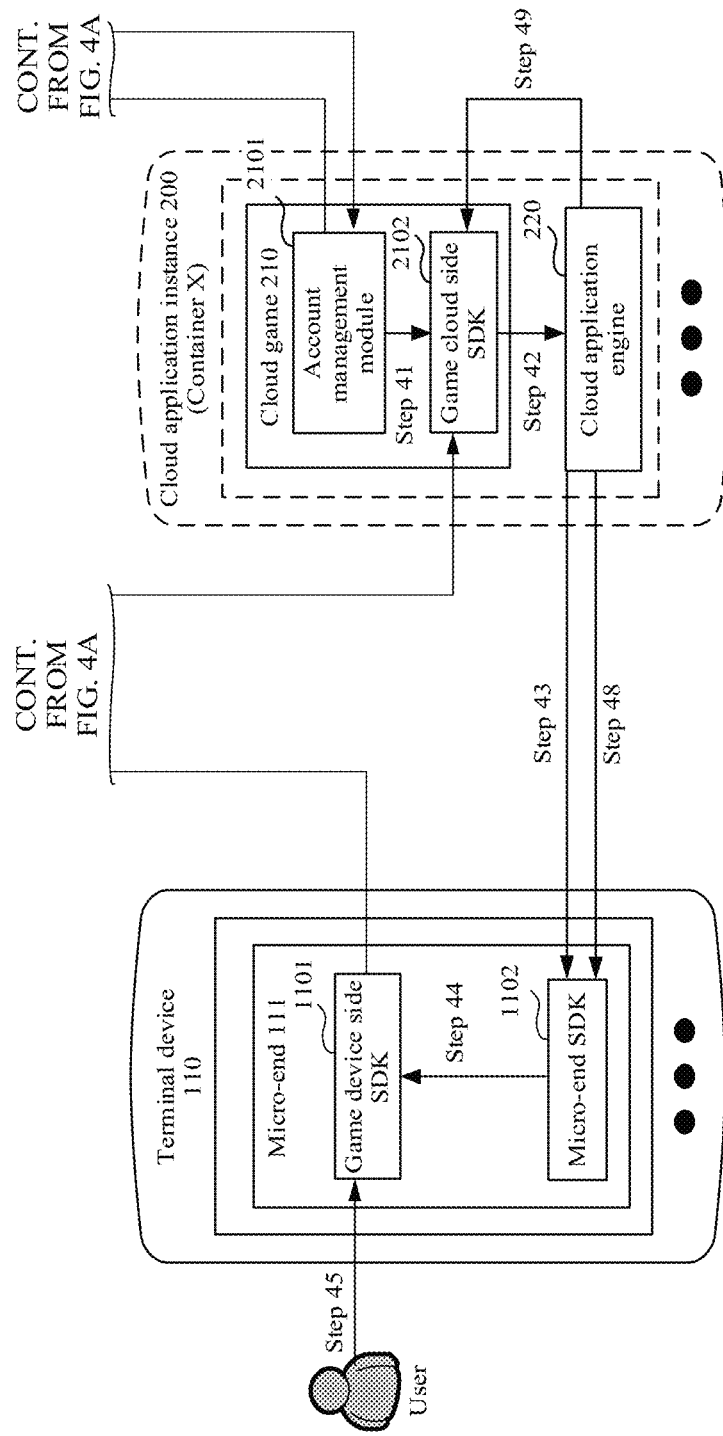

First, refer to FIG. 4A and FIG. 4B. FIG. 4A and FIG. 4B are a schematic flowchart of steps of a login method based on a cloud application instance 200 provided in this disclosure in an application scenario.

In this application scenario, the terminal device 110 is a smartphone on which a micro-end 111 is installed, where the micro-end 111 means a micro-client or a thin client. The micro-end 111 focuses only on processing data display of a user interface (UI), and is only responsible for sending an operation action of a user to a cloud application instance 200 connected to the micro-end 111 for processing, and then receiving an audio and video stream sent by the cloud application instance 200 and displaying the audio and video stream to the user. Therefore, memory occupation of the micro-end 111 is small, an installation package is also small, and the user can quickly download the micro-end 111. The micro-end 111 includes a game device side SDK 1101 and a micro-end SDK 1102. The game device side SDK 1101 is configured to process interaction between the terminal device 110 and an account management node 140, for example, send an obtained login password to the account management node 140 for verification. The micro-end SDK is configured to process interaction between the terminal device 110 and the cloud application instance 200, for example, receive a login request sent by the cloud application instance 200 for the application service node 120.

The cloud application instance 200 includes a cloud game 210 and a cloud application engine 220, where the cloud game 210 includes an account management module 2101 and a game cloud side SDK 2102. The account management module 2101 is configured to process information related to account login, for example, send verification success information to the application service node 120 to request login. The game cloud side SDK 2102 is configured to process interaction with the account management node 140, for example, obtain verification success information from the account management node 140. The cloud application engine is configured to process interaction between the cloud application instance 200 and the terminal device 110, for example, send a login request for the application service node 120 to the terminal device 110.

It should be noted that the cloud application engine 220 in the cloud application instance 200 is generated when a cloud platform 131 creates the cloud application instance 200, the account management module 2101 and the game cloud side SDK 2102 may be integrated into the cloud game 210, and the game device side SDK 1101 and the micro-end SDK 1102 may also be integrated into the micro-end 111. Simply speaking, after a third-party game vendor provides the micro-end 111 and the cloud application instance 200, the game device side SDK 1101 and the micro-end SDK 1102 are integrated into the micro-end 111, and the account management module 2101 and the game cloud side SDK 2102 are integrated into the cloud game 210, such that the login method based on a cloud application instance provided in this disclosure can be implemented.

In this application scenario, the application service node 120 is a service software system constituted based on a plurality of modules such as a cloud server module, an application and game instance rendering module, an audio and video encoding and decoding module, a network transmission module, a resource management and scheduling system module, and a terminal access module.

It should be noted that the unit modules of the cloud game login system shown in FIG. 4A and FIG. 4B may be divided into a plurality of types. The modules may be software modules, or may be hardware modules, or may be partially software modules and partially hardware modules. FIG. 4A and FIG. 4B are only an example division manner, and this is not limited in this disclosure.

In the application scenario shown in FIG. 4A and FIG. 4B, the login method based on a cloud application instance provided in this disclosure may include the following steps.

Step 40: The account management node 140 receives registration information and instance status information sent by the cloud platform 131, where the registration information includes a first correspondence between a cloud platform account and a registration password, the status information includes a second correspondence between a device identity of the cloud application instance 200 and the cloud platform account, and the account management node 140 may record the second correspondence. The user may register the cloud platform account on the cloud platform 131 and input the registration password. The cloud platform 131 records the correspondence between the cloud platform account and the registration password information as the registration information. In addition, the user may pay on the cloud platform using the cloud platform account, to rent the cloud application instance 200, the cloud platform 131 records the correspondence between the cloud platform account and the device identity of the cloud application instance 200 as the instance status information, and the cloud platform 131 sends the instance status information and the registration information to the account management node 140. For content that is not described in step S40, refer to step S409 in the foregoing content. Details are not described herein again.

Step 41: The account management module 2101 of the cloud game 210 sends a login request to the game cloud side SDK 2102. The login request may be generated in a process in which the terminal device 110 remotely manipulates the cloud application instance 200, and the login request is a login request for the application service node 120.

It should be understood that, before step 41, the terminal device 110 needs to establish a connection channel such as a notify event channel to the cloud application instance 200. The micro-end SDK 1102 may obtain the device identity of the cloud application instance 200 using the connection channel, and then remotely manipulate the cloud application instance 200 using the connection channel, to experience the cloud game.

Step 42: The game cloud side SDK 2102 sends a login request to the cloud application engine 220.

Step 43: The cloud application engine 220 sends a login request for the application service node 120 to the micro-end SDK 1102 using the notify event channel. For content that is not described in step S41 to step S43, refer to step S410 in the foregoing content. Details are not described herein again.

It should be understood that the cloud application engine 220 interacts with the micro-end SDK 1102 of the terminal device 110 only through the event channel, and all interaction information is anonymized information, to avoid a user privacy leakage problem.

Step 44: The micro-end SDK 1102 sends the login request for the application service node 120 to the game device side SDK 1101.

Step 45: The game device side SDK 1101 obtains a login password input by the user, for example, collects a fingerprint of the user, or collects a face image of the user. This is not limited in this disclosure. The login password is the password information corresponding to the cloud platform account.

Step 46: The game device side SDK 1101 sends a verification request carrying the login password and the device identity of the cloud application instance 200 to the account management node 140. For content that is not described in step S44 to step S46, refer to step S420 in the foregoing content. Details are not described herein again.

Step 47: The account management node 140 may verify the login password, and generate verification success information when the verification succeeds.

It may be understood that the account management node 140 records the registration information and the instance status information, where the registration information includes the first correspondence between the cloud platform account and the registration password, the status information includes the second correspondence between the device identity of the cloud application instance 200 and the cloud platform account, and the account management node 140 may record the second correspondence. Therefore, in step 47, after receiving the login password sent by the user and the device identity, the account management node 140 may first determine, based on the device identity and the stored second correspondence, the cloud platform account corresponding to the device identity, and then obtain, based on the first correspondence and the cloud platform account, the registration password input during user registration. The account management node 140 may compare the login password with the registration password, and when the login password is consistent with the registration password, confirm that the verification succeeds and generate the verification success information. It may be understood that although the terminal device 110 sends the login password to the account management node 140, the terminal device 110 does not send the cloud platform account, and the account management node 140 obtains, based on the device identity, the cloud platform account corresponding to the login password. In this way, even if the login password is learned by another person, the cloud platform account corresponding to the password information cannot be learned. Therefore, a transmission process is very secure, and privacy data of the user is strongly ensured.

Step 48: The cloud application engine 220 sends a confirmation request to the micro-end SDK 1102 of the terminal device 110, to confirm whether the game device side SDK 1101 performs step 46, that is, whether the verification request has been sent to the account management node 140.

During specific implementation, the cloud application engine 220 may poll the micro-end SDK 1102 through an event channel, to query whether the game device side SDK 1101 has sent the login password and the device identity to the account management node 140. The micro-end SDK 1102 confirms an execution status of step 46 to the device side SDK on the terminal side, and then returns the execution status to the cloud application engine through the event channel, where the event channel may be a notify event channel.

In an embodiment, the game device side SDK 1101 may alternatively notify the micro-end SDK 1102 after sending the verification request to the account management node 140, and the micro-end SDK 1102 may send, to the cloud application engine 220 through the event channel, a notification indicating that step 46 has been completed. A specific procedure of how the cloud application engine determines whether the terminal device 110 sends the verification request to the account management node 140 is not limited in this disclosure.

Step 49: When confirming, to the micro-end SDK 1102, that the game device side SDK 1101 has performed step 46, the cloud application engine 220 sends a notification to the game cloud side SDK 2102, such that the game cloud side SDK 2102 sends a verification success information obtaining request to the account management node 140

It may be understood that, after the cloud application engine 220 sends the confirmation request to the micro-end SDK 1102, if a returned result shows that the game device side SDK 1101 has not performed step 46, the cloud application engine 220 may send the confirmation request to the micro-end SDK 1102 again, that is, step 48 is repeated, until it is confirmed that the game device side SDK 1101 has performed step 46, step 49 is performed.

Step 50: The game cloud side SDK 2102 obtains the verification success information from the account management node 140, where the verification success information may be a Token.

The game cloud side SDK 2102 may send the verification success information obtaining request carrying the device identity to the account management node 140. It may be understood that, in step 46, when the game device side SDK 1101 sends the verification request carrying the login password to the account management node 140, the device identity of the cloud application instance 200 is also carried as a pairing basis. Therefore, in step 50, the account management node 140 may determine, based on the device identity in the obtaining request sent by the game cloud side SDK 2102, the login password carrying the same device identity, and then return verification success information generated using the login password to the game cloud side SDK 2102 of the cloud application instance 200.

It may be understood that, for content that is not described in step S47 to step S50, refer to step S430 in the foregoing embodiment. Details are not described herein again.

Step 51: The game cloud side SDK 2102 sends the verification success information to the account management module 2101, and the account management module 2101 sends the verification success information to the application service node 120 to request login.

Step 52: The application service node 120 sends a check request carrying the verification success information to the account management node 140, to request the account management node 140 to check the verification success information. When determining that the verification success information exists locally, the account management node 140 may further determine whether the cloud platform account corresponding to the verification success information is bound to an application account. Because the embodiment in FIG. 4A and FIG. 4B is described using an example in which the user has never registered an application account, the application service node 120 determines that the cloud platform account is not bound to an application account, and the account management node 140 generates check success information and an application account creation request.

Step 53: The account management node 140 returns the check success information and the application account creation request to the application service node 120.

Step 54: The application service node 120 creates a new account based on the application account creation request, and allows the cloud application instance 200 to log in to the application service node 120 using the newly created application account.

During specific implementation, the application service node 120 may randomly create an application account based on the application account creation request. The application service node 120 may further create a new game archive, bind the game archive to the newly created application account, and return the newly created application account to the account management node 140, such that the account management node 140 may bind the newly created application account to the cloud platform account, and store the binding relationship in a database maintained by the account management node 140.

In this way, when the user logs in to the application service node 120 using the cloud application instance 200 again, the cloud application instance 200 may perform step 41 to step 43 to send the login request to the terminal device 110, the terminal device 110 performs step 44 to step 46 to send the login password and the device identity to the account management node 140, the account management node 140 performs step 47 to perform verification on the login password to generate the verification success information, and the cloud application instance 200 performs step 48 to step 51 to obtain the verification success information from the account management node 140, and send the verification success information to the application service node 120 to request login, the application service node 120 may perform step 52 to send the check request of the verification success information to the account management node 140. After successfully checking the verification information, the account management node 140 may further confirm that the cloud platform account is bound to the application account, and then return the application account bound to the cloud platform account and the check success information to the application service node 120, such that the application service node 120 can read game information such as a game archive and a user key of the application account, and allow the cloud application instance 200 to log in to the application service node 120 again using the application account, and the user can log in to the application service node 120 without recording the application account.

It may be understood that, in the login method based on a cloud application instance 200 provided in this disclosure, and in the application scenario shown in FIG. 4A and FIG. 4B, each time the user logs in to the application service node 120 using the cloud application instance 200, the cloud application instance 200 notifies the terminal device 110. The terminal device 110 sends, to the account management node 140, the login password used to log in to the cloud platform account for verification. If the verification succeeds, the cloud application instance 200 can log in to the application service node 120, and login password information does not need to be sent to the cloud application instance 200, thereby resolving the problem that there is a security risk when the user logs in to the application using the cloud application instance 200.

For ease of understanding beneficial effects of the solutions provided in embodiments of this disclosure, for example, an application scenario in which the application described in FIG. 4A and FIG. 4B is a cloud game, the terminal device 110 is a smartphone, and the cloud application instance 200 is a container is used as an example to describe some example graphical user interfaces on which the user operates the terminal device 110 to remotely invoke the cloud application instance 200 to log in to the application service node 120 in a process of step 40 to step 54.

It is assumed that the user taps a cloud platform application on the terminal device 110 to enter a home screen 11 of the cloud platform application. Herein, the cloud platform application is connected to the public cloud data center 130 in the foregoing content. The user may purchase various cloud application instances 200 using the cloud platform application, and transfer local mobile phone applications to the cloud application instance 200 for running. The local terminal device 110 of the user does not need to install a large quantity of applications that consume hardware resources, such that the application can be lightweight.

Figure 5:
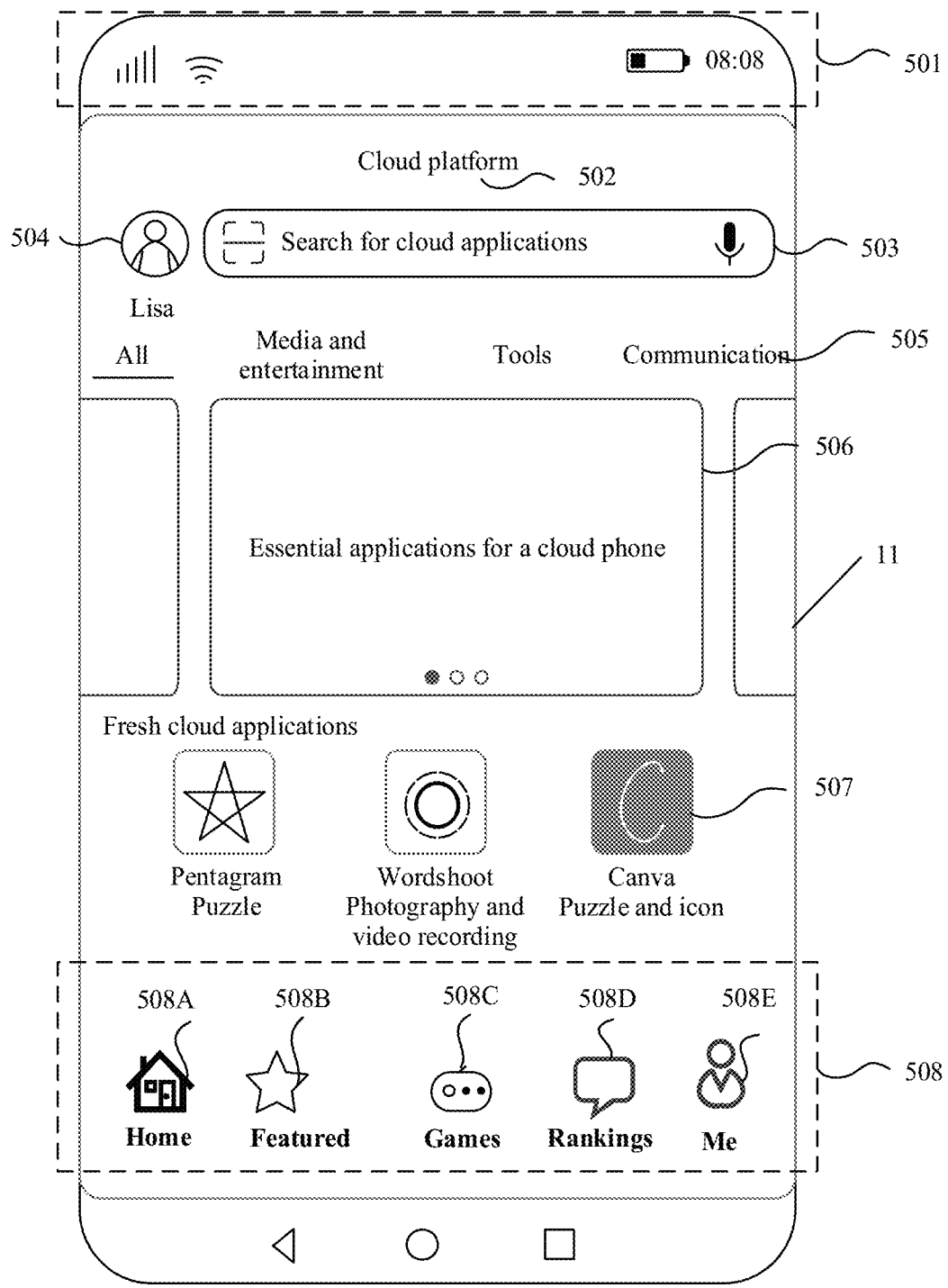
FIG. 5 to FIG. 8 are schematic diagrams of embodiments of some user interfaces in a login method based on a cloud application instance according to this disclosure.

FIG. 5 shows an example of a user home screen 11 of a cloud platform of a terminal device 110. The user interface 11 may include: a status bar 501, an application title bar 502, a search box 503, a control 504, a function bar 505, a plurality of recommendation display boxes 506, a plurality of fresh controls 507, and a tray 508 of commonly used controls.

The status bar 501 may include one or more signal strength indicators of a mobile communications signal (which may also be referred to as a cellular signal), one or more signal strength indicators of a WI-FI signal, a battery status indicator, and a time indicator.

The application title bar 502 may be used to indicate that a current page is used to display an interface of the cloud platform of the terminal device 110. A representation form of the application title bar 502 may be text information, an icon, or another form.

The search box 503 may be used to search, based on a character input by a user, for a setting option that matches the character.

The control 504 may receive a user operation (for example, a touch operation). In response to the detected user operation, the terminal device 110 may display an interface for logging in to a cloud platform account or an interface for switching a cloud platform account.

The function bar 505 includes a plurality of controls, such as a media and entertainment control, a tools control, and a communication control. Each control can be used to receive a user operation (for example, a touch operation). In response to the detected user operation, the terminal device 110 may display a corresponding page, for example, display an audio-visual entertainment interface, a utility interface, and a social communication interface.

The plurality of recommendation display boxes 506 are used to display covers of cloud applications recommended for download.

The plurality of fresh controls 507 are configured to display controls of a plurality of newly released cloud applications. Each control may be used to receive a user operation (for example, a touch operation). In response to the detected user operation, the terminal device 110 may display a page of a corresponding cloud application.

The tray 508 of common controls may display: a Home page control icon 508A, a Featured control icon 508B, a Games control icon 508C, a Rankings control icon 508D, and a Me control icon 508E. All the foregoing control icons may accept a user operation (for example, a touch operation). In response to the detected user operation, the terminal device 110 may display a responded page. The Home control icon 508A may be used to display a home page of the cloud platform, the Featured control icon 508B may be used to display a page recommended to the user, the Games control icon 508C may be used to display a page of a game application, and the Rankings control icon 508D may be used to display a page of application download or rating ranking, and the Me control icon 508E may be used to display an account center page.

It may be understood that FIG. 5 merely shows an example of an interface of the cloud platform application of the terminal device 110, and should not constitute a limitation on this embodiment of this disclosure.

Figure 6A:
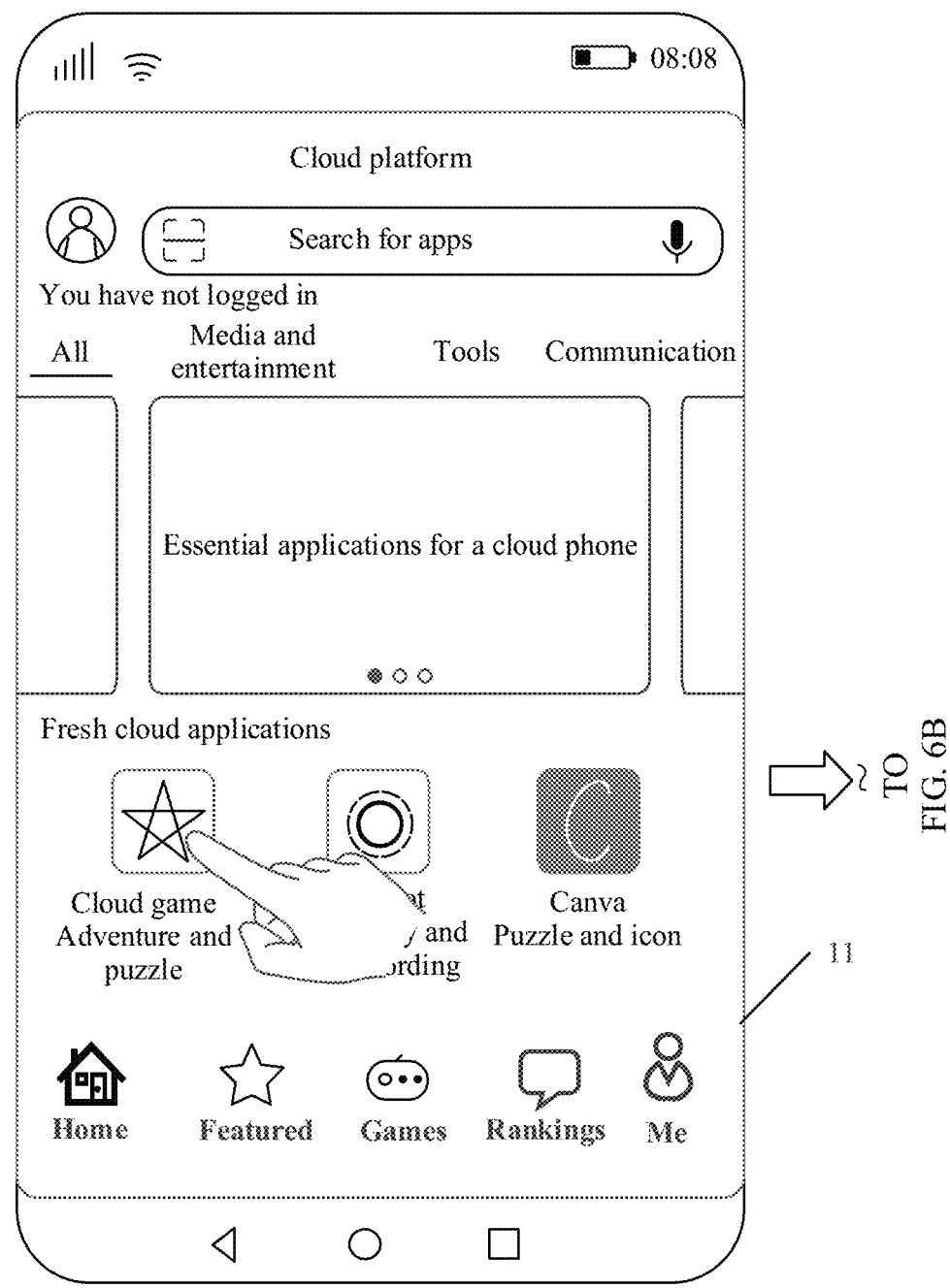
Figure 6B:
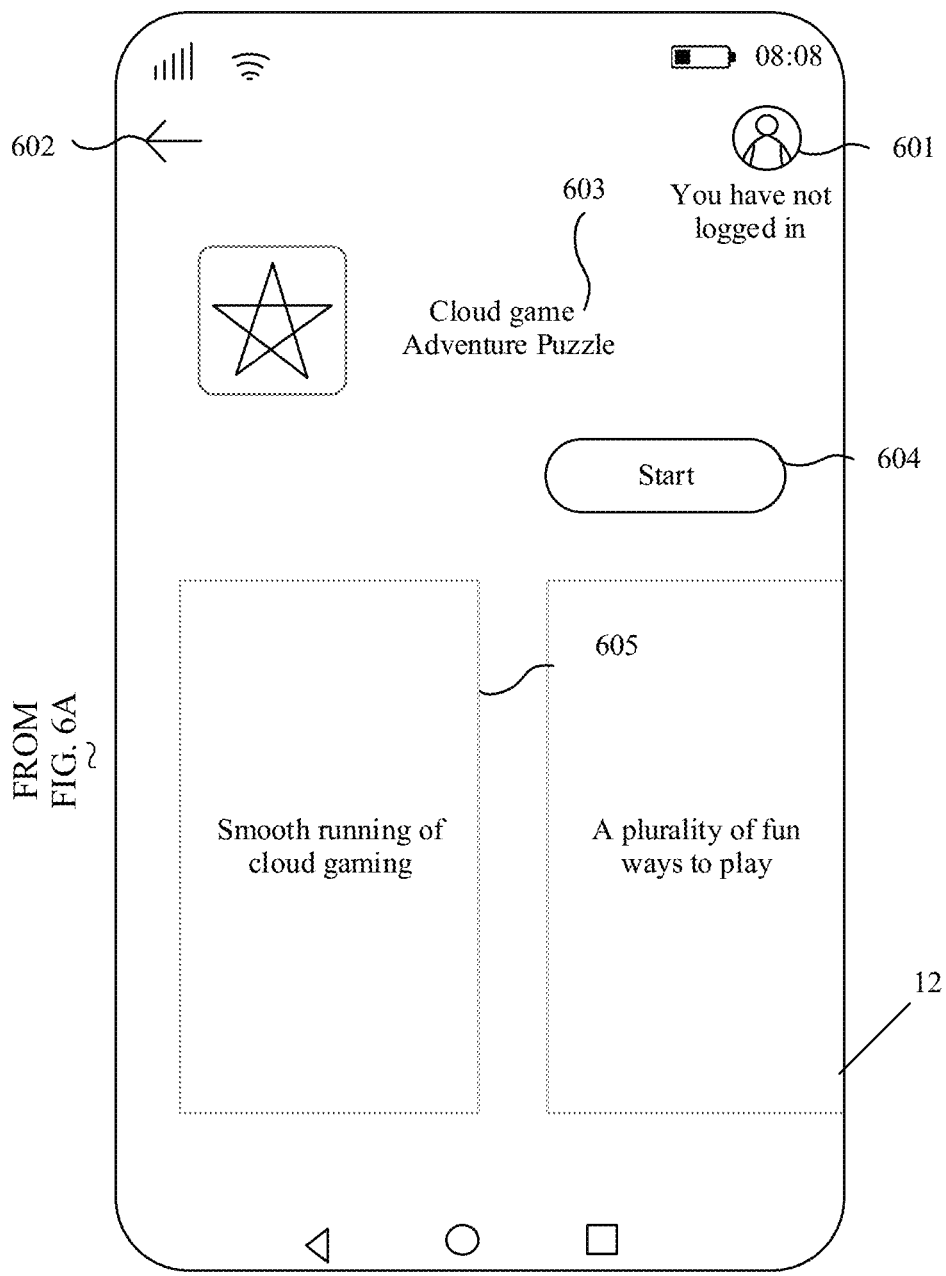

For example, as shown in FIG. 6A and FIG. 6B, after a user taps a control icon of a cloud application "cloud game" in a plurality of fresh controls 507, a terminal device 110 detects the user operation. In response to the user operation, the terminal device 110 may display an interface 12 of the cloud application "cloud game" shown in FIG. 6A and FIG. 6B.

The user interface 12 may include: an account control 601, a return control 602, a cloud application title bar 603, a start control 604, and a plurality of cloud application introduction display boxes 605. The account control 601 may receive a user operation (for example, a touch operation). In response to the detected user operation, the terminal device 110 may display an interface for logging in to a cloud platform account.

The return control 602 may receive a user operation (for example, a touch operation). In response to the detected user operation, the terminal device 110 may exit the user interface 12 of the account center, and display a previous user interface of the user interface 12, for example, the user interface 11.

The cloud application title bar 603 is used to indicate that the current page is used to display a startup and an introduction interface of the "cloud game". The cloud application title bar 603 may include classification information, an application name, and the like of the cloud application displayed on the current page. A representation form of the cloud application title bar 603 may include text information, an icon, or another form.

The start control 604 may receive a user operation (for example, a touch operation). In response to the detected user operation, the terminal device 110 may start the cloud application "cloud game".

The plurality of cloud application introduction display boxes 605 are used for game content introduction of the cloud application "cloud game".

It may be understood that FIG. 6A and FIG. 6B merely show an example of the user interface 12 of the cloud application "cloud game" of the terminal device 110, and should not constitute a limitation on this embodiment of this disclosure.

Figure 7A:
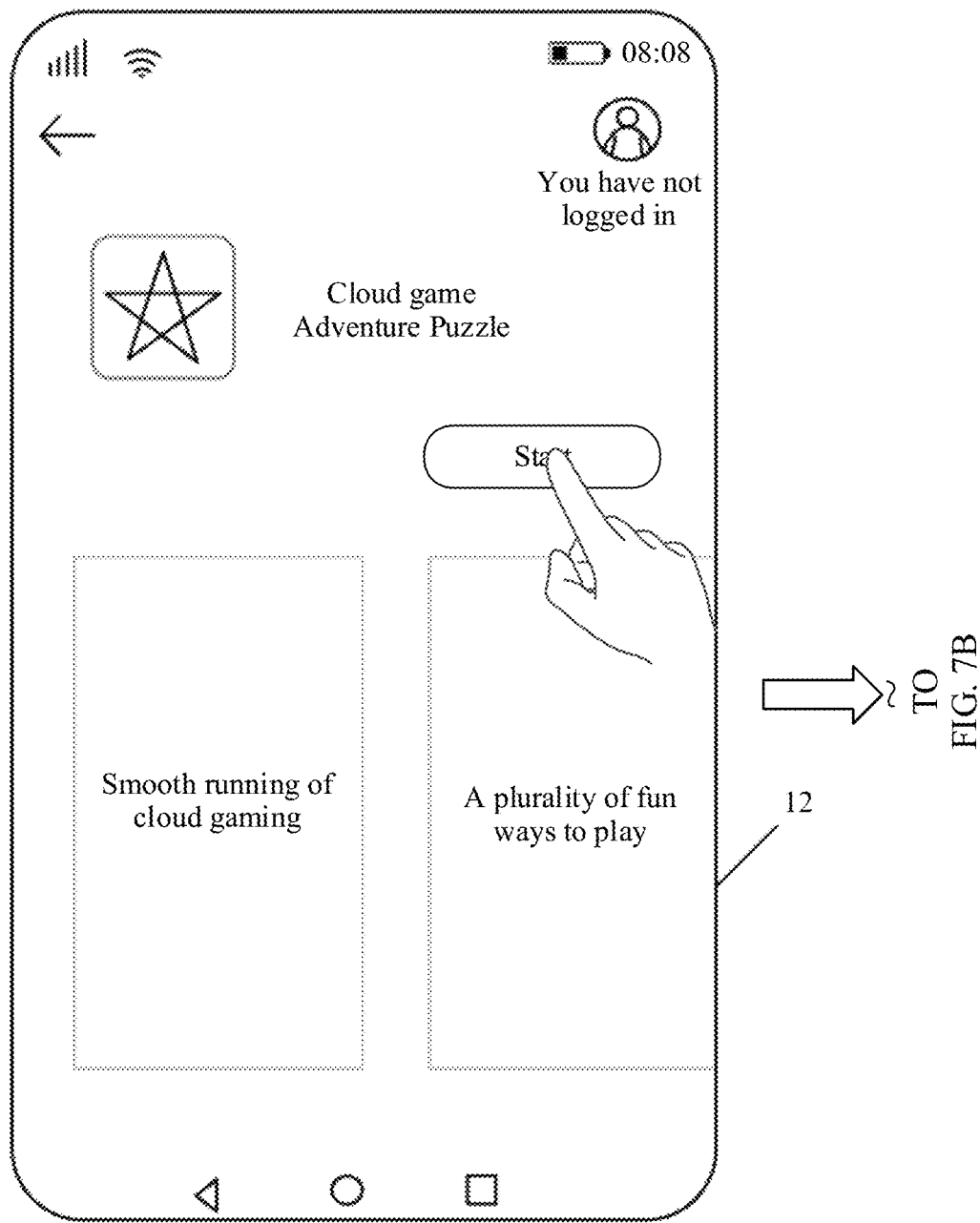
Figure 7B:
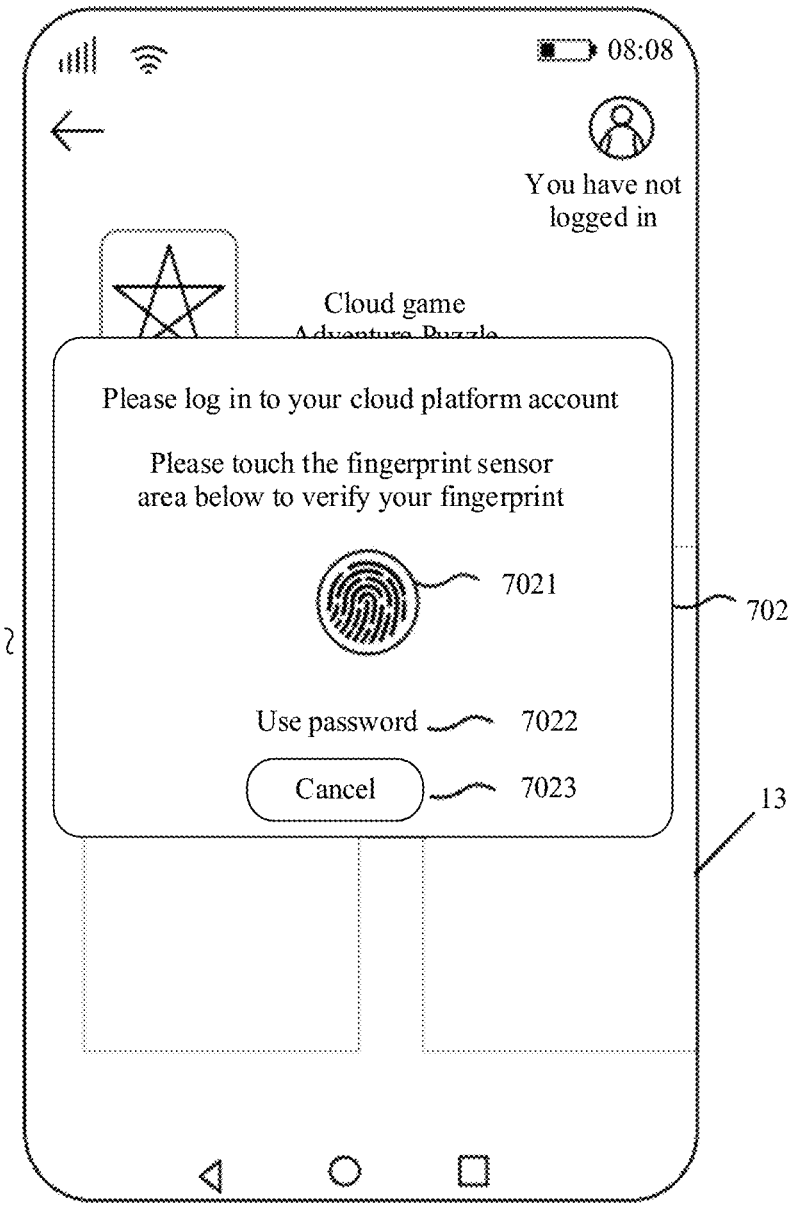

For example, as shown in FIG. 7A and FIG. 7B, a user may tap a start control. A terminal device 110 detects the user operation, and sends a connection request to a cloud platform 131 in response to the user operation. The cloud platform 131 may create, based on a running environment of the "cloud game", a cloud application instance 200 on which the application "cloud game" is installed, and then establish a connection channel between the cloud application instance 200 and the terminal device 110. The terminal device 110 may obtain a device identity of the cloud application instance 200 from the connection channel.

Then, an account management module 2101 of the cloud application instance 200 may generate a login request, and send the login request to a game cloud side SDK 2102 (that is, step 41), the game cloud side SDK 2102 may send the login request to a cloud application engine 220 (that is, step 42), and the cloud application engine 220 may send the login request to a micro-end SDK 1102 of the terminal device 110 through the previously created connection channel (for example, a Notify event channel) (step 43). The micro-end SDK 1102 of the terminal device 110 may send the login request to a game device side SDK 1101, and the game device side SDK 1101 may obtain a login password corresponding to the cloud platform account from the user. The terminal device 110 may display a login password input interface 13 shown in FIG. 7A and FIG. 7B to the user. It should be understood that an example in which the login password is fingerprint information is used for description in FIG. 7A and FIG. 7B. The login password may alternatively be information in another form such as password information or face information. A specific form of the login password is not limited in this disclosure.

The user interface 13 may include a sub-login interface 702. The sub-login interface 702 includes a fingerprint input area 7021, a switching password input control 7022, and a cancel control 7023.

The fingerprint input area 7021 is used to remind the user to input fingerprint information in the area. The area may receive a user operation (for example, a touch operation). In response to the detected user operation, the terminal device 110 may collect the fingerprint information input by the user, that is, the login password.

The switching password input control 7022 is used to receive a user operation (for example, a touch operation). In response to the detected user operation, the terminal device 110 may display a character password input interface.

The cancel control 7023 is used to receive a user operation (for example, a touch operation). In response to the detected user operation, the terminal device 110 may return to the user interface 12.

It may be understood that FIG. 7A and FIG. 7B merely show an example of the interface 13 used by the terminal device 110 to collect the user login password after the user taps the start control, and should not constitute a limitation on this embodiment of this disclosure.

Figure 8:
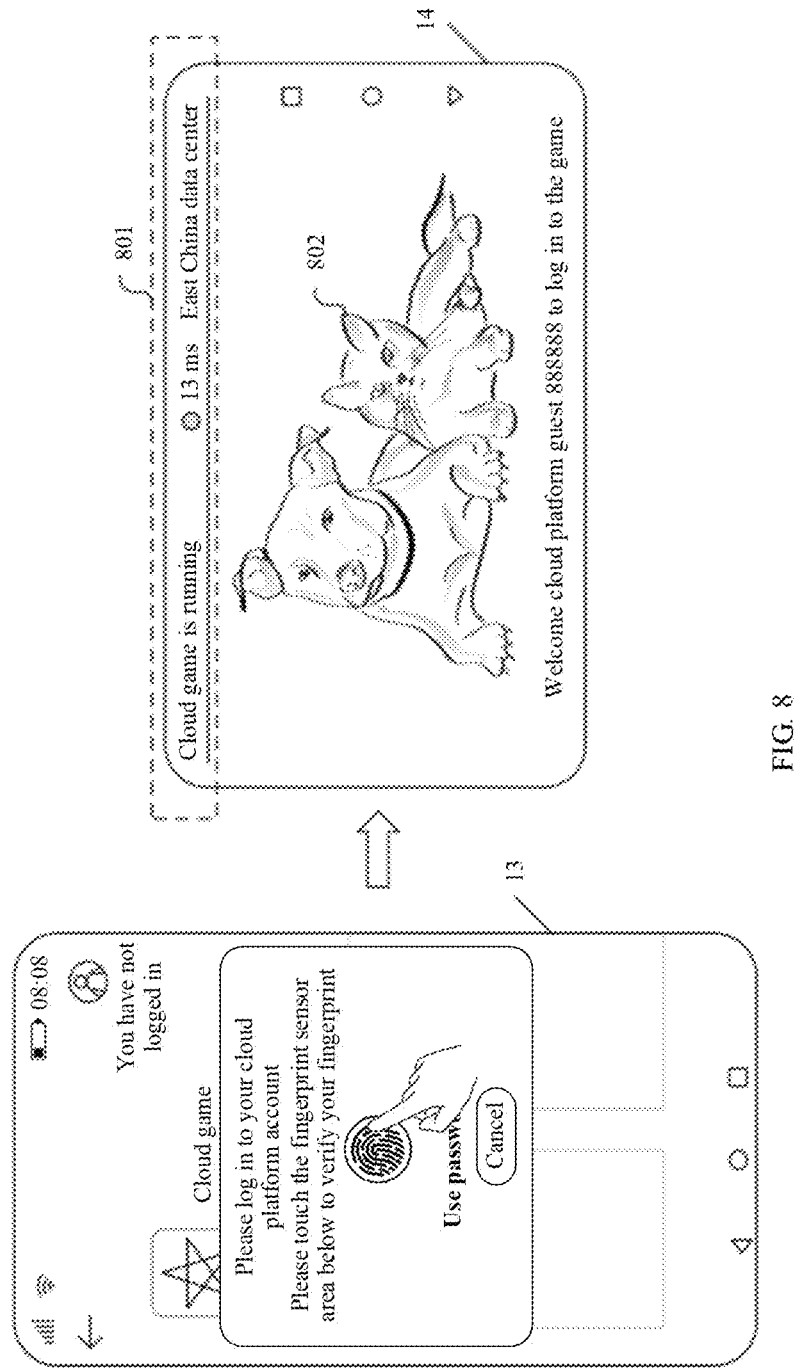

For example, as shown in FIG. 8, a user may enter fingerprint information in a fingerprint input area 7021. A terminal device 110 detects the user operation, and in response to the user operation, sends a collected login password and a device identity of a cloud application instance 200 to an account management node 140 using a game device side SDK 1101 (that is, step 46). The account management node 140 may obtain, based on a second correspondence stored in a database, a cloud platform account corresponding to the device identity, obtain, based on a first correspondence, a registration password (that is, the fingerprint information input during user registration) corresponding to the cloud platform account, compare the login password with the registration password, and when the login password is consistent with the registration password, generate verification success information (that is, step 47).

At the same time, the cloud application engine 220 of the cloud application instance 200 may continuously send a confirmation request (that is, step 48) to the micro-end SDK 1102 through the connection channel (for example, a Notify event channel), to request to confirm whether the game device side SDK 1101 has sent the login password and the device identity to the account management node 140. In a case of confirming that the login password and the device identity have been sent, the cloud application engine may send a notification indicating that the verification success information may be obtained to a game cloud side SDK (that is, step 49), and a game cloud side SDK 2102 may send a verification success information obtaining request to the account management node 140, where the obtaining request also includes the device identity of the cloud application instance 200. The account management node 140 may determine, based on the device identity, the verification success information of the cloud platform account corresponding to the device identity, and then return the verification success information (which may be a Token) to the game cloud side SDK 2102 of the cloud application instance 200 (step 50). The game cloud side SDK 2102 may send the verification success information to an account management module 2101, and the account management module 2101 sends the verification success information to an application service node 120 to request login.

After receiving the verification success information sent by the account management module 2101, the application service node 120 may send the verification success information to the account management node 140 for check. After determining that the account management node 140 records the verification success information, the account management node 140 may further determine whether the cloud platform account corresponding to the verification success information is bound to an application account. In a case in which no application account is bound, the account management node 140 sends an application account creation request to the application service node 120. The application service node 120 may create a new application account "cloud platform guest 888888", bind a newly created game archive to the application account "cloud platform guest 888888", and return the application account to the account management node 140, such that the account management node 140 may bind the application account to the cloud platform account. Finally, the application service node 120 may allow the cloud application instance 200 to log in to the application service node 120 using the newly created application account "cloud platform guest 888888". After logging in to the application service node 120, the cloud application instance 200 may send generated audio and video streams to the terminal device, and the terminal device may play and display the audio and video streams. For example, the terminal device 110 may display a game interface 14 shown in FIG. 8 to the user.

The game interface 14 may include a prompt box 801 and a game picture 802.

The prompt box 801 includes a plurality of elements. In FIG. 8, three elements are used as an example for description. "Cloud game is running" is used to prompt a name of a currently running cloud application, "13 ms" is used to prompt a current network delay, and "East China data center" is used to prompt an address of a data center in which the cloud application instance 200 currently running the application is located. It may be understood that if a network delay is excessively high, the user may select a relatively close data center to reduce the network delay and improve user experience.

The game picture 802 is used to display a game picture, and the game picture may be generated based on the audio and video streams sent by the cloud application instance 200.

It may be understood that FIG. 8 merely shows an example of the game interface 14 after the cloud application instance 200 logs in to the application service node 120, and should not constitute a limitation on this embodiment of this disclosure.

It should be noted that the user operations of logging in to the application service node 120 using the cloud application instance 200 listed in FIG. 5 to FIG. 8 are not limited. There may be other user operations during specific implementation. This is not limited in this embodiment of this disclosure.

In conclusion, in the login method based on a cloud application instance 200 provided in this disclosure, it can be learned from FIG. 5 to FIG. 8 that each time the user logs in to the application service node 120 using the cloud application instance 200, the user only needs to send, to the account management node 140 using the terminal device 110, the login password corresponding to the cloud platform account for verification. If the verification succeeds, the user can log in to the application service node 120, and the login password information does not need to be sent to the cloud application instance 200, thereby resolving the problem that there is a security risk when the user logs in to the application server 120 using the cloud application instance 200.

The method in embodiments of this disclosure is described in detail above. For ease of better implementing the solutions in embodiments of this disclosure, correspondingly, related devices used to cooperate in implementing the solutions are further provided below.

Figure 9:
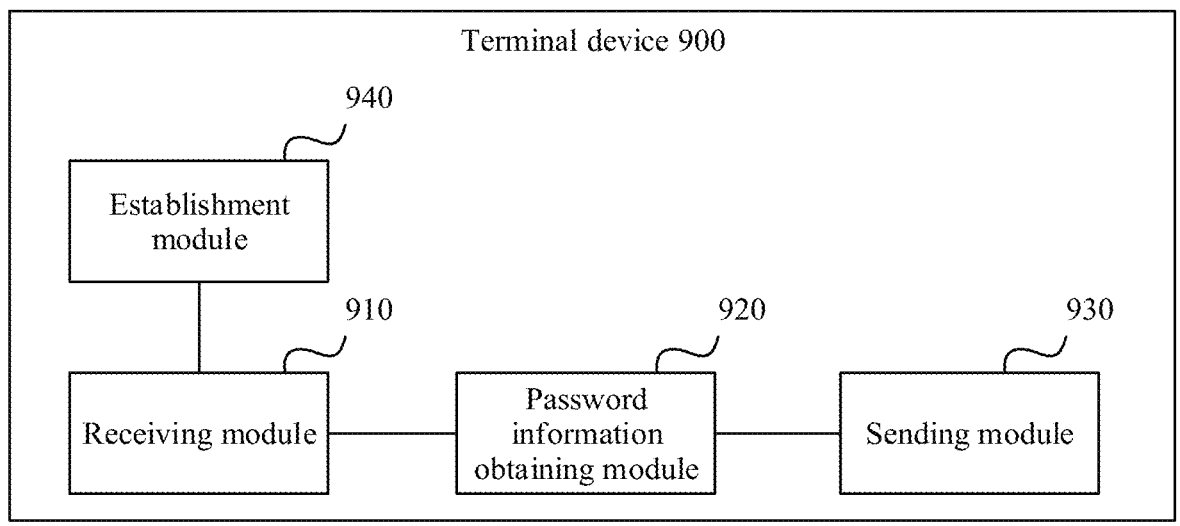
FIG. 9 is a schematic diagram of a structure of a terminal device according to this disclosure.

FIG. 9 is a schematic diagram of a structure of a terminal device 900 according to this disclosure. The terminal device 900 may be the terminal device 110 in the foregoing content. As shown in FIG. 9, the terminal device 900 provided in this disclosure may include: a receiving module 910, configured to receive a login request for an application service node that is sent by a cloud application instance; a password information obtaining module 920, configured to obtain, based on the login request, a login password input by a user; and a sending module 930, configured to send a verification request that carries the login password and a device identity of the cloud application instance to an account management node, where the verification request is used to indicate the account management node to: verify the login password, and send verification success information to the cloud application instance based on the device identity.

In an embodiment, the terminal device 900 further includes an establishment module 940. The establishment module 940 is configured to: before the receiving module 910 receives the login request for the application service node that is sent by the cloud application instance, establish a connection channel to the cloud application instance, and obtain the device identity from the cloud application instance. It may be understood that only anonymized status information or action information is transmitted between the cloud application instance and the terminal device through an event pipeline, and no password information related to user privacy is transmitted, such that privacy data of a user is strongly ensured.

It should be understood that internal unit modules of the terminal device 900 shown in FIG. 9 may also be divided into a plurality of types, and the modules may be software modules, or may be hardware modules, or some may be software modules and the other may be hardware modules. This is not limited in this disclosure. FIG. 9 is an example of a division manner. This is not limited in this disclosure.

According to the terminal device 900 provided in this disclosure, each time a user logs in to an application service node using a cloud application instance, a terminal device may receive a login request sent by the cloud application instance, and send, to an account management node, a login password used to log in to a cloud platform account for verification. If the verification succeeds, the cloud application instance can log in to the application service node, and login password information does not need to be sent to the cloud application instance, thereby resolving a problem that there is a security risk when the user logs in to the application service node using the cloud application instance.

Figure 10:
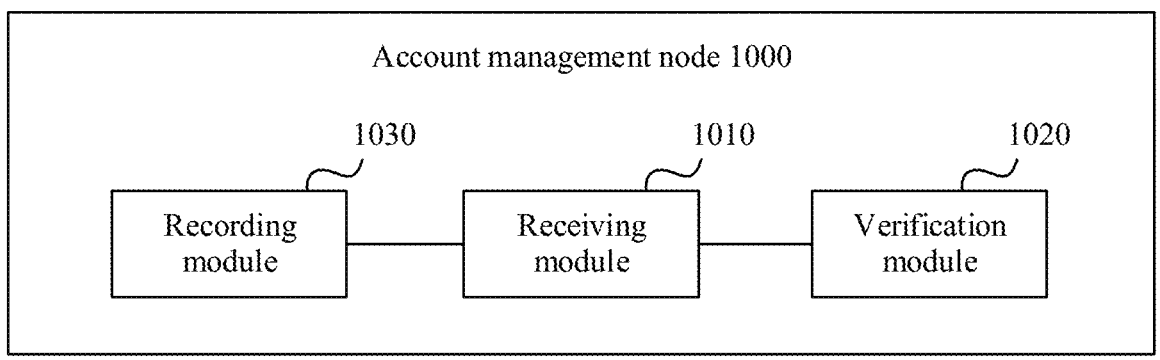
FIG. 10 is a schematic diagram of a structure of an account management node according to this disclosure.

FIG. 10 is a schematic diagram of a structure of an account management node 1000 according to this disclosure. The account management node 1000 may be the account management node 140 in the foregoing content. As shown in FIG. 10, the account management node 1000 may include: a receiving module 1010, configured to receive a verification request that carries a device identity of a cloud application instance and a login password and that is sent by a terminal device, where the login password is a login password obtained from a user after the terminal device receives a login request for an application service node that is sent by the cloud application instance; and a verification module 1020, configured to: verify the login password, generate verification success information when the verification succeeds, and send the verification success information to the cloud application instance based on the device identity, such that the cloud application instance logs in to the application service node based on the verification success information.

In an embodiment, the account management node 1000 further includes a recording module 1030, configured to: before the receiving module 1010 receives the verification request that carries the device identity of the cloud application instance and the login password and that is sent by the terminal device, record registration information and instance status information, where the registration information includes a first correspondence between a cloud platform account and a registration password, and the instance status information includes a second correspondence between the cloud platform account and the device identity of the cloud application instance. Therefore, the verification module 1020 is further configured to: obtain the cloud platform account from the second correspondence based on the device identity of the cloud application instance that is carried in the verification request, obtain the registration password from the first correspondence based on the cloud platform account, compare the login password with the registration password, and when the login password is consistent with the registration password, confirm that the verification succeeds.

Optionally, the registration information and the instance status information may be sent by a cloud platform to the account management node. The user may register the cloud platform account on the cloud platform and input the registration password. The cloud platform records the correspondence between the cloud platform account and the registration password information as the registration information. In addition, the user may pay on the cloud platform using the cloud platform account, to rent the cloud application instance, and the cloud platform records the correspondence between the cloud platform account and the device identity of the cloud application instance as the instance status information.

It should be understood that internal unit modules of the terminal device 1000 shown in FIG. 10 may also be divided into a plurality of types, and the modules may be software modules, or may be hardware modules, or some may be software modules and the other may be hardware modules. This is not limited in this disclosure. FIG. 10 is an example of a division manner. This is not limited in this disclosure.

According to the account management node provided in this disclosure, each time a user logs in to an application service node using a cloud application instance, the cloud application instance notifies a terminal device. The account management node receives a login password used to log in a cloud platform account that is sent by the terminal device, and verifies the login password. If the verification succeeds, the cloud application instance can log in to the application service node, and login password information does not need to be sent to the cloud application instance, thereby resolving a problem that there is a security risk when the user logs in to the application service node using the cloud application instance.

Figure 11:
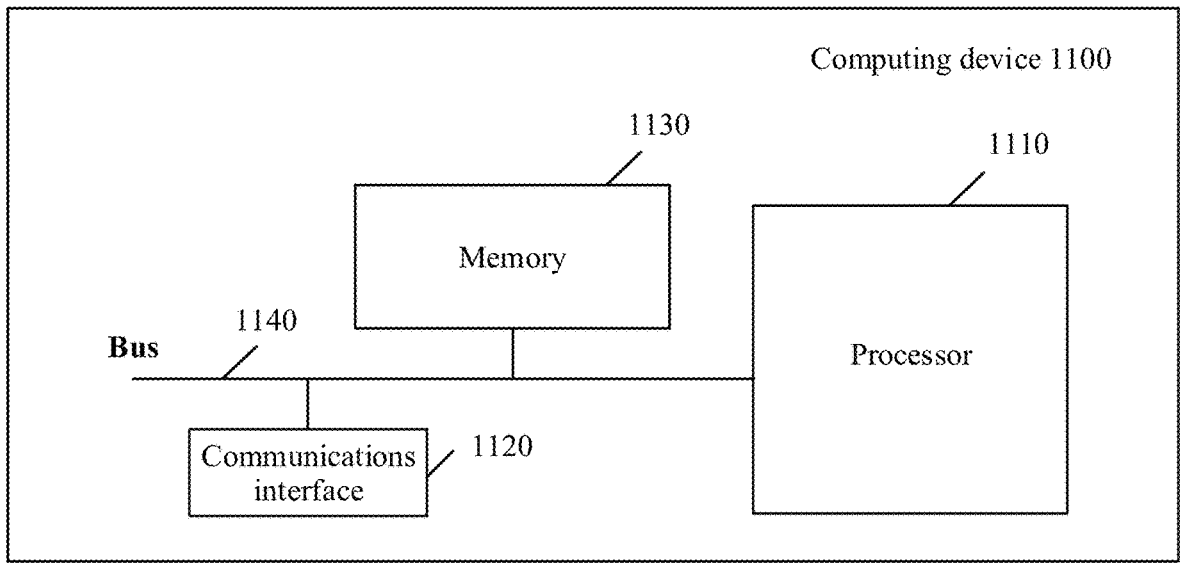
FIG. 11 is a schematic diagram of a hardware structure of a computing device according to this disclosure.

FIG. 11 is a schematic diagram of a structure of a computing device 1100 according to an embodiment of this disclosure. The computing device 1100 may be the account management node 140 and the account management node 1000 in the embodiments in FIG. 1A to FIG. 10. As shown in FIG. 11, the computing device 1100 includes a processor 1110, a communications interface 1120, and a memory 1130. The processor 1110, the communications interface 1120, and the memory 1130 may be connected to each other using an internal bus 1140, or may implement communication using another means such as wireless transmission. In this embodiment of this disclosure, that the processor 1110, the communications interface 1120, and the memory 1130 are connected to each other using the bus 1140 is used as an example. The bus 1140 may be a Peripheral Component Interconnect (PCI) bus, an Extended Industry Standard Architecture (EISA) bus, or the like. The communications bus 1140 may be classified into an address bus, a data bus, a control bus, or the like. For ease of representation, only one bold line is used to represent the bus in FIG. 11, but this does not mean that there is only one bus or only one type of bus.

The processor 1110 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof. The processor 1110 executes various types of digital storage instructions, such as software or firmware programs stored in the memory 1130, such that the computing device 1100 provides various services.

The memory 1130 is configured to store program code, and the processor 1110 controls execution of the program code, to perform the processing steps of the account management node in any embodiment in FIG. 1A to FIG. 10. The program code may include one or more software modules. The one or more software modules may be the software modules provided in the embodiment in FIG. 10, for example, a verification module, a recording module, and a receiving module. The verification module is configured to: verify a login password, generate verification success information when the verification succeeds, and send the verification success information to a cloud application instance based on a device identity. The recording module is configured to record registration information and status information. The receiving module is configured to receive a verification request that carries the device identity of the cloud application instance and the login password and that is sent by a terminal device. The program code may be used to perform step S420 and step S430 and optional steps thereof in the embodiment in FIG. 3A and FIG. 3B, step 46 and step 47, step 50, step 52 and step 53, and optional steps thereof in the embodiment in FIG. 4A and FIG. 4B, and may be further configured to perform other steps performed by the account management node described in the embodiments in FIG. 1A to FIG. 10. Details are not described herein again.

It should be noted that this embodiment may be implemented using a general-purpose physical server, for example, an ARM server or an X86 server, or may be implemented using a virtual machine implemented based on a general-purpose physical server based on an NFV technology. The virtual machine means a complete computer system that is simulated using software and that has a complete hardware system function and runs in a completely isolated environment. This is not limited in this disclosure.

The memory 1130 may include a volatile memory, such as a random-access memory (RAM). Alternatively, the memory 1130 may include a non-volatile memory, such as a read-only memory (ROM), a flash memory, a hard disk drive (HDD), or a solid-state drive (SSD). Alternatively, the memory 1130 may include a combination of the foregoing types of memories. The memory 1130 may store program code, and may include program code used to perform other steps described in the embodiments in FIG. 1A to FIG. 10. Details are not described herein again. The memory 1130 stores a first correspondence and a second correspondence, where the first correspondence is a correspondence between a cloud platform account and a registration password, and the second correspondence is a correspondence between a cloud platform account and a device identity.

The communications interface 1120 may be a wired interface (for example, an Ethernet interface), an internal interface (for example, a Peripheral Component Interconnect Express (PCIe) interface), a wired interface (for example, an Ethernet interface), or a wireless interface (for example, a cellular network interface or a wireless local area network interface) that is configured to communicate with another device or module.

It should be noted that FIG. 11 is only a possible implementation of this embodiment of this disclosure. During actual application, the computing device may alternatively include more or fewer components. This is not limited herein. For content that is not shown or not described in this embodiment of this disclosure, refer to related descriptions in the embodiments in FIG. 1A to FIG. 10. Details are not described herein again.

It should be understood that the computing device shown in FIG. 11 may alternatively be a computer cluster including at least one server. This is not limited in this disclosure.

Figure 12:
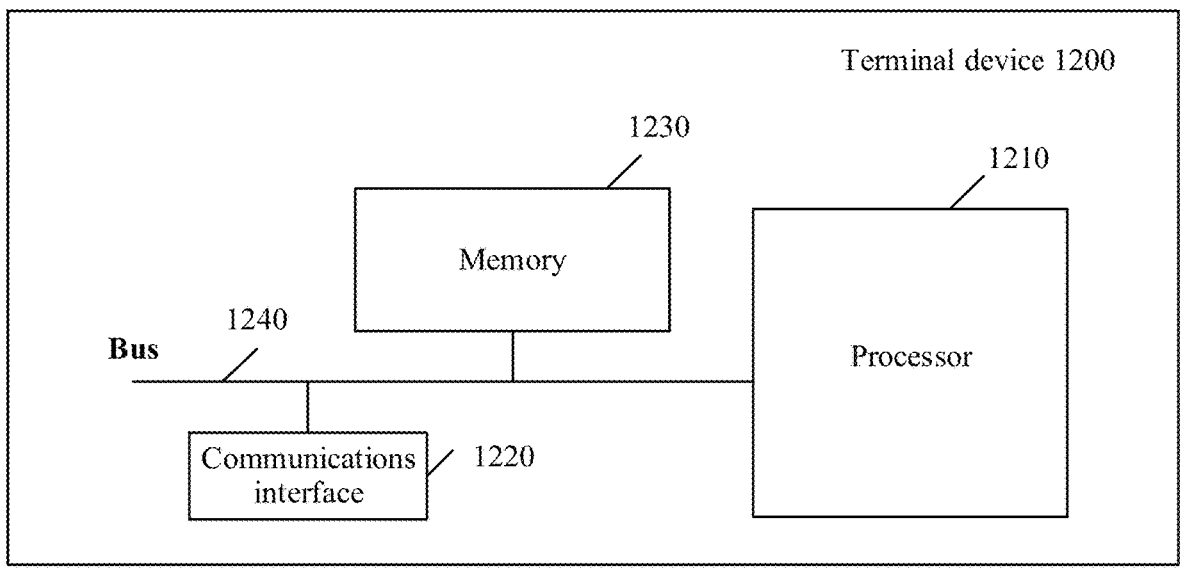
FIG. 12 is a schematic diagram of a hardware structure of a terminal device according to this disclosure.

FIG. 12 is a schematic diagram of a structure of a terminal device 1200 according to an embodiment of this disclosure. The terminal device 1200 may be the terminal device 110 or the terminal device 900 in the embodiments in FIG. 1A to FIG. 10. As shown in FIG. 12, the terminal device 1200 includes a processor 1210, a communications interface 1220, and a memory 1230. The processor 1210, the communications interface 1220, and the memory 1230 may be connected to each other using an internal bus 1240, or may implement communication using another means such as wireless transmission. In this embodiment of this disclosure, that the processor 1210, the communications interface 1220, and the memory 1230 are connected to each other using the internal bus 1240 is used as an example. The bus 1240 may be a PCI bus, an EISA bus, or the like. The communications bus 1240 may be classified into an address bus, a data bus, a control bus, or the like. For ease of representation, only one bold line is used to represent the bus in FIG. 12, but this does not mean that there is only one bus or only one type of bus.

The processor 1210 may include at least one general-purpose processor, for example, a CPU, or a combination of a CPU and a hardware chip. The hardware chip may be an ASIC, a PLD, or a combination thereof. The PLD may be a CPLD, an FPGA, GAL, or any combination thereof. The processor 1210 executes various types of digital storage instructions, for example, software or firmware programs stored in the memory 1230, such that a terminal device 1200 can provide a wide variety of services.

The memory 1230 is configured to store program code, and the processor 1210 controls execution of the program code, to perform the processing steps of the terminal device in any embodiment in FIG. 1A to FIG. 8. The program code may include one or more software modules. The one or more software modules may be the software modules such as the receiving module, the sending module, and the password information obtaining module provided in the embodiment in FIG. 9. The receiving module is configured to receive a login request for an application service node that is sent by a cloud application instance. The password information obtaining module 920 is configured to obtain, based on the login request, a login password input by a user. The sending module 930 is configured to send, to an account management node, a verification request that carries a login password and a device identity of the cloud application instance. The program code may be used to perform step S410 and step S420 and optional steps thereof in the embodiment in FIG. 3A and FIG. 3B, step 43 to step 46, step 48, and optional steps thereof in the embodiment in FIG. 4A and FIG. 4B, and may be further used to perform other steps performed by the account management node described in the embodiments in FIG. 1A to FIG. 8. Details are not described herein again.

The memory 1230 may include a volatile memory such as a RAM. Alternatively, the memory 1230 may include a non-volatile memory such as a ROM, a flash memory, an HDD, or an SSD. Alternatively, the memory 1230 may include a combination of the foregoing types of memories. The memory 1230 may store program code, and may include program code used to perform other steps described in the embodiments in FIG. 1A to FIG. 8. Details are not described herein again. The memory 1230 may further store a device identity, where the device identity is a device identity of a cloud application instance connected to the memory 1230, and the device identity may be a device identity obtained, after the terminal device 1200 establishes a channel to the cloud application instance, by the terminal device 1200 from the cloud application instance through the channel.

The communications interface 1220 may be a wired interface (for example, an Ethernet interface), an internal interface (for example, a PCIe interface), a wired interface (for example, an Ethernet interface), or a wireless interface (for example, a cellular network interface or a wireless local area network interface) that is configured to communicate with another device or module.

It should be noted that FIG. 12 is only a possible implementation of this embodiment of this disclosure. During actual application, the computing device may alternatively include more or fewer components. This is not limited herein. For content that is not shown or not described in this embodiment of this disclosure, refer to related descriptions in the embodiments of FIG. 1A to FIG. 8. Details are not described herein again.

An embodiment of this disclosure further provides a computer-readable storage medium. The computer-readable storage medium stores instructions. When the instructions are run on a processor, the method procedures shown in FIG. 1A to FIG. 8 are implemented.

An embodiment of this disclosure further provides a computer program product. When the computer program product runs on a processor, the method procedures shown in FIG. 1A to FIG. 8 are implemented.

All or some of the foregoing embodiments may be implemented by software, hardware, firmware, or any combination thereof. When software is used to implement embodiments, the foregoing embodiments may be implemented completely or partially in a form of a computer program product. The computer program product includes at least one computer instruction. When the computer program instructions are loaded and executed on a computer, all or some of the procedures or functions according to embodiments of the present disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating at least one usable medium. The usable medium may be a magnetic medium (for example, a floppy disk, a hard disk drive, or a magnetic tape), an optical medium (for example, a high-density digital video disc (DVD)), or a semiconductor medium. The semiconductor medium may be an SSD.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A login method comprising:
sending, by a cloud application instance, a login request for an application service node to a terminal device;
obtaining, by the terminal device based on the login request, a login password from a user;
sending, by the terminal device, a verification request that carries the login password and a device identity of the cloud application instance to an account management node;
verifying, by the account management node, the login password;
generating, by the account management node, verification success information when the verification succeeds;
sending, by the account management node and based on the device identity, the verification success information to the cloud application instance; and
logging in, by the cloud application instance and based on the verification success information, to the application service node.

2. The login method of claim 1, wherein before verifying, by the account management node, the login password, the login method further comprises:
recording, by the account management node, registration information, wherein the registration information comprises a first correspondence between a cloud platform account and a registration password; and
recording, by the account management node, instance status information,
wherein the instance status information comprises a second correspondence between the cloud platform account and the device identity, and
wherein verifying, by the account management node, the login password comprises:
obtaining, by the account management node and based on the device identity, the cloud platform account from the second correspondence;
obtaining, by the account management node and based on the cloud platform account, the registration password from the first correspondence;
comparing, by the account management node, the login password with the registration password; and
confirming, by the account management node, that the verification succeeds when the login password is consistent with the registration password.

3. The login method of claim 1, wherein sending, by the account management node and based on the device identity, the verification success information to the cloud application instance comprises:
sending, by the cloud application instance, a verification result obtaining request to the account management node, wherein the verification result obtaining request carries the device identity; and
sending, by the account management node and based on the device identity, the verification success information to the cloud application instance.

4. The login method of claim 1, wherein logging in, by the cloud application instance and based on the verification success information, to the application service node comprises:
sending, by the cloud application instance, the verification success information to the application service node;
sending, by the application service node, a check request to the account management node, wherein the check request carries the verification success information;
determining, by the account management node, that the account management node records the verification success information;
sending, by the account management node, an application account creation request to the application service node;
creating, by the application service node and based on the application account creation request, an application account; and
allowing, by the application service node, the cloud application instance to log in to the application service node by using the application account.

5. The login method of claim 1, wherein before sending, by the cloud application instance, the login request for the application service node to the terminal device, the login method further comprises:
establishing, by the terminal device, a connection channel to the cloud application instance; and
obtaining, by the terminal device, the device identity from the cloud application instance.

6. The login method of claim 1, wherein the cloud application instance comprises a virtual machine, a container, or a bare metal server.

7. The login method of claim 1, wherein the application service node comprises a game server, an education application service node, a video application service node, a social application service node, or a virtual reality application service node.

8. A login system comprising:
a cloud application instance virtualized on a physical server and configured to send a login request for an application service node;
a terminal device comprising:
a first memory configured to store first program code; and
a first processor coupled to the first memory and configured to execute the first program code to:
receive the login request from the cloud application instance;
obtain, based on the login request, a login password from a user; and
send a verification request that carries the login password and a device identity of the cloud application instance; and
an account management node configured to:
a second memory configured to store second program code; and
a second processor coupled to the second memory and configured to execute the second program code to:
receive the verification request and the device identity from the terminal device;
verify the login password;
generate verification success information when the verification succeeds; and
send, based on the device identity, the verification success information to the cloud application instance,
wherein the cloud application instance virtualized on the physical server is further configured to log in, based on the verification success information, to the application service node.

9. The login system of claim 8, wherein before verifying the login password, the account management node is further configured to record registration information, wherein the registration information comprises a first correspondence between a cloud platform account and a registration password, wherein the account management node is further configured to record instance status information, wherein the instance status information comprises a second correspondence between the cloud platform account and the device identity, and wherein the second processor of the second program code of the account management node is further configured to execute the second program code to:
    obtain, based on the device identity, the cloud platform account from the second correspondence;
    obtain, based on the cloud platform account, the registration password from the first correspondence;
    compare the login password with the registration password; and
    confirm that the verification succeeds when the login password is consistent with the registration password.

10. The login system of claim 8, wherein the cloud application instance virtualized on the physical server is further configured to send a verification result obtaining request to the account management node, wherein the verification result obtaining request carries the device identity, and wherein the account management node is further configured to send, based on the device identity, the verification success information to the cloud application instance.

11. The login system of claim 8, wherein the cloud application instance virtualized on the physical server is further configured to send the verification success information to the application service node, wherein the application service node comprises:
    a third memory configured to store third program code; and
    a third processor coupled to the third memory and configured to execute the third program code to send a check request to the account management node, wherein the check request carries the verification success information,
wherein the second processor of the account management node is further configured to execute the second program code to:
    determine that the account management node records the verification success information; and
    send an application account creation request to the application service node, and wherein the application service node is further configured to:
        create, based on the application account creation request, an application account; and
        allow the cloud application instance to log in to the application service node using the application account.

12. The login system of claim 8, wherein before receiving the login request from the cloud application instance, the first processor of the terminal device is further configured to execute the first program code to:
    establish a connection channel to the cloud application instance; and
    obtain the device identity from the cloud application instance.

13. The login system of claim 8, wherein the cloud application instance comprises a virtual machine or a container.

14. The login system of claim 8, wherein the application service node comprises a game server, an education application service node, a video application service node, a social application service node, or a virtual reality application service node.

15. The login system of claim 8, wherein the terminal device comprises a mobile phone, a tablet computer, a personal computer, a smart television, or a game console.

16. The login system of claim 8, wherein the login password comprises biological information or a password.

17. A login method implemented by an account management node, wherein the login method comprises:
    receiving a verification request from a terminal device, wherein the verification request carries a device identity of a cloud application instance and a login password, and wherein the login password is from a user;
    verifying the login password;
    generating verification success information when the verification succeeds; and
    sending, based on the device identity, the verification success information to the cloud application instance.

18. The login method of claim 17, wherein before receiving the verification request from the terminal device, the login method further comprises:
    recording registration information, wherein the registration information comprises a first correspondence between a cloud platform account and a registration password; and
    recording instance status information,
wherein the instance status information comprises a second correspondence between the cloud platform account and the device identity, and
wherein verifying the login password comprises:
    obtaining, based on the device identity, the cloud platform account from the second correspondence;
    obtaining, based on the cloud platform account, the registration password from the first correspondence;
    comparing the login password with the registration password; and
    confirming that the verification succeeds when the login password is consistent with the registration password.

19. A computing device, comprising:
a memory comprising instructions; and
a processor coupled to the memory and configured to execute the instructions to:
    receive a verification request from a terminal device, wherein the verification request carries a device identity of a cloud application instance and a login password, and wherein the login password is from a user;
    verify the login password;
    generate verification success information when the verification succeeds; and
    send, based on the device identity, the verification success information to the cloud application instance to instruct the cloud application instance to log in, based on the verification success information, to an application service node.

20. The computing device of claim 19, wherein before receiving the verification request from the terminal device, the processor is further configured to execute the instructions to:
    record registration information, wherein the registration information comprises a first correspondence between a cloud platform account and a registration password;
    record instance status information, wherein the instance status information comprises a second correspondence between the cloud platform account and the device identity;
    obtain, based on the device identity, the cloud platform account from the second correspondence;
    obtain, based on the cloud platform account, the registration password from the first correspondence;

compare the login password with the registration password; and confirm that the verification succeeds when the login password is consistent.

* * * * *